(12) United States Patent
Rakhe et al.

(10) Patent No.: US 11,541,750 B2
(45) Date of Patent: Jan. 3, 2023

(54) CENTER BEARING BRACKET ASSEMBLY

(71) Applicant: Dana Automotive Systems Group, LLC, Maumee, OH (US)

(72) Inventors: Sandip S. Rakhe, Pune (IN); Vishal V. Pandarkar, Pune (IN); Nilesh D. Kharade, Pune (IN)

(73) Assignee: Dana Automotive Systems Group, LLC, Maumee, OH (US)

( * ) Notice: Subject to any disclaimer, the term of this patent is extended or adjusted under 35 U.S.C. 154(b) by 44 days.

(21) Appl. No.: 17/198,627

(22) Filed: Mar. 11, 2021

(65) Prior Publication Data
US 2021/0284016 A1 Sep. 16, 2021

(30) Foreign Application Priority Data
Mar. 11, 2020 (IN) .............................. 202011010389

(51) Int. Cl.
*B60K 17/24* (2006.01)
(52) U.S. Cl.
CPC .......... *B60K 17/24* (2013.01); *F16C 2326/06* (2013.01)
(58) Field of Classification Search
CPC ..... B60K 17/24; B60K 17/36; F16C 2326/06; F16C 27/066
See application file for complete search history.

(56) References Cited

U.S. PATENT DOCUMENTS

| | | | | |
|---|---|---|---|---|
| 2,138,659 A | * | 11/1938 | Kindig | F16C 35/047 384/541 |
| 2,687,926 A | * | 8/1954 | Gair | F16C 19/06 384/536 |
| 2,796,304 A | * | 6/1957 | Downs | F16C 23/084 384/537 |
| 2,857,974 A | * | 10/1958 | Heller | B60K 17/24 188/379 |
| 3,001,841 A | * | 9/1961 | Glavan | F16C 23/084 29/898.08 |
| 4,392,694 A | * | 7/1983 | Reynolds | B60K 17/24 384/536 |
| 4,463,993 A | * | 8/1984 | Brissette | F16C 27/066 384/536 |
| 4,542,996 A | * | 9/1985 | Brissette | F16C 35/047 267/293 |
| 4,571,098 A | * | 2/1986 | Rudnik | F16C 33/6622 384/537 |
| 5,172,985 A | * | 12/1992 | Constancio | B60K 17/24 384/582 |

(Continued)

FOREIGN PATENT DOCUMENTS

WO   2011119020   9/2011

*Primary Examiner* — Paul N Dickson
*Assistant Examiner* — Timothy Wilhelm
(74) *Attorney, Agent, or Firm* — Marshall & Melhorn, LLC

(57) ABSTRACT

A bracket assembly for use in a vehicle. The bracket assembly includes one or more first center bearing brackets, one or more plates, and one or more attachment members. At least a portion of the one or more plates are connected to at least a portion of the first center bearing bracket and to at least a portion of a body or frame of a vehicle. Additionally, at least a portion of the one or more attachment members are connected to at least a portion of the first center bearing bracket, to at least a portion of the one or more plates, and/or to at least a portion of the body or frame of the vehicle.

7 Claims, 11 Drawing Sheets

(56) References Cited

U.S. PATENT DOCUMENTS

| | | | | |
|---|---|---|---|---|
| 5,208,981 A * | 5/1993 | Puzsik | | B29C 45/14467 |
| | | | | 29/898.07 |
| 5,469,931 A | 11/1995 | Kawata | | |
| 5,551,783 A * | 9/1996 | Whitney | | B60K 17/24 |
| | | | | 384/536 |
| 5,829,892 A * | 11/1998 | Groves | | F16C 35/077 |
| | | | | 384/537 |
| 5,868,503 A * | 2/1999 | Bade | | F16C 27/066 |
| | | | | 384/582 |
| 5,870,931 A * | 2/1999 | Frantz | | F16D 3/841 |
| | | | | 74/609 |
| 6,345,680 B1 * | 2/2002 | Hill | | B60K 17/24 |
| | | | | 180/209 |
| 6,379,048 B1 * | 4/2002 | Brissette | | F16C 35/047 |
| | | | | 384/441 |
| 6,672,768 B2 * | 1/2004 | Borsch | | B60K 17/24 |
| | | | | 384/536 |
| 6,997,813 B2 * | 2/2006 | Blumke | | F16D 3/78 |
| | | | | 464/183 |
| 7,044,646 B1 * | 5/2006 | Aiken | | F16C 27/066 |
| | | | | 384/536 |
| 7,500,788 B2 * | 3/2009 | Joyner | | F16F 15/027 |
| | | | | 384/536 |
| 7,534,048 B2 * | 5/2009 | Holman | | F16C 23/06 |
| | | | | 384/537 |
| 8,070,365 B2 * | 12/2011 | Hoppert | | F16C 35/00 |
| | | | | 384/535 |
| 8,646,566 B1 * | 2/2014 | Bouzit | | B60K 17/24 |
| | | | | 248/157 |
| 8,851,491 B2 * | 10/2014 | Bouzit | | B60K 17/24 |
| | | | | 280/124.156 |
| 9,677,605 B2 * | 6/2017 | Cheon | | F16C 27/066 |
| 9,856,911 B2 * | 1/2018 | Yoo | | F16C 27/066 |
| 10,968,953 B2 * | 4/2021 | Roberts | | F16C 33/303 |
| 11,098,757 B2 * | 8/2021 | Holman | | F16C 27/066 |

\* cited by examiner

CENTER BEARING BRACKET ASSEMBLY

FIELD OF THE DISCLOSURE

The present disclosure relates to a center bearing bracket assembly for use in a vehicle.

BACKGROUND OF THE DISCLOSURE

Various center bearing bracket assemblies are known in the art. Conventional center bearing bracket assemblies have poor noise, vibration, and harshness (NVH) characteristics, are difficult to manufacture, are difficult to install on a vehicle, have a poor overall life and durability, and tend to cause fouling between a center bearing cushion and the various mating components of the assembly. As a result, if would therefore be advantageous to develop a center bearing bracket assembly that has improved NVH characteristics, is easy to manufacture, is easy to install on a vehicle, has an improved overall life and durability, and does not cause damage to the center bearing cushion when installed on the vehicle.

SUMMARY OF THE DISCLOSURE

A bracket assembly for use in a vehicle. The bracket assembly includes one or more first center bearing brackets, one or more plates, and one or more attachment members. At least a portion of the one or more plates are connected to at least a portion of the first center bearing bracket and to at least a portion of a body or frame of a vehicle. Additionally, at least a portion of the one or more attachment members are connected to at least a portion of the first center bearing bracket, to at least a portion of the one or more plates, and/or to at least a portion of the body or frame of the vehicle.

According to the previous aspect of the disclosure, the one or more plates and the one or more attachment members may be integrally formed as a single component and/or the one or more plates may be integrally formed as part of the body or frame of the vehicle.

According to any one of the previous aspects of the disclosure, the center bearing bracket assembly may have a first center bearing bracket having a body portion having an inner surface, an outer surface, a first side, a second side, a first portion, a second portion, and a third portion. The first and the third portions of the first center bearing bracket may be disposed on opposing ends of the second portion of the center bearing bracket and may extend away from the second portion of the center bearing bracket. One or more first extending portions may extend outward and away from at least a portion of the first side of the body portion of the first center bearing bracket and one or more second extending portions may extend outward and away from at least a portion of the second side of the body portion of the first center bearing bracket.

According to any one of the previous aspects of the disclosure, the first center bearing bracket may further include one or more apertures extending from the inner surface to the outer surface of the one or more first extending portions of the first center bearing bracket. Additionally, the first center bearing bracket may further include one or more apertures extending from the inner surface to the outer surface of the one or more second extending portions of the first center bearing bracket.

According to any one of the previous aspects of the disclosure, the first center bearing bracket may include one or more first mounting portions that extend outward and away from at least a portion of the one or more first extending portions, the one or more second extending portions, and/or the first portion of the body portion of the first center bearing bracket. Additionally, the first center bearing bracket may further include one or more second mounting portions that extend outward and away from at least a portion of the one or more first extending portions, the one or more second extending portions, and/or the third portion of the body portion of the first center bearing bracket.

According to any one of the previous aspects of the disclosure, the one or more first mounting portions of the first center bearing bracket may have one or more receiving portions therein. The one or more second mounting portions of the first center bearing bracket may have one or more receiving portions therein. The one or more receiving portions in the one or more first mounting portions of the first center bearing bracket and the one or more receiving portions in the one or more second mounting portions of the first center bearing bracket may be of a size and shape to receive and/or retain at least a portion of a second center bearing bracket therein. Additionally, the second center bearing bracket may have a size and shape to receive and/or retain at least a portion of a center bearing cushion therein.

According to any one of the previous aspects of the disclosure, the one or more plates may have one or more receiving portions therein having a size and shape to receive at least a portion of a first joint assembly therein when the first joint assembly is in operation.

According to any one of the previous aspects of the disclosure, the one or more attachment members may have one or more first extending portions extending outward therefrom away from the body or frame of the vehicle. At least a portion of the one or more first extending portions of the one or more attachment members may be connected to at least a portion of the one or more plates and/or the first center bearing bracket of the center bearing bracket assembly.

According to any one of the previous aspects of the disclosure, the one or more attachment members may have one or more ribs and/or one or more receiving portions. The one or more ribs of the one or more attachment members may extend outward from a body portion of the one or more attachment members and the one or more first extending portions of the one or more attachment members. Additionally, the one or more receiving portions in the one or more extending portions of the one or more attachment members may have a size and shape to receive at least a portion of a first joint assembly therein when the first joint assembly is in operation.

According to any one of the previous aspects of the disclosure, the one or more plates may have one or more extending portions extending outward away from the one or more plates toward the body or frame of the vehicle. At least a portion of the one or more extending portions of the one or more plates may be connected to at least a portion of the body or frame of the vehicle and/or the one or more attachment members of the center bearing bracket assembly.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the center bearing bracket assembly disclosed herein may be used in automotive, off-road vehicle, all-terrain vehicle, construction, structural, marine, aerospace, locomotive, military, machinery, robotic and/or consumer product applications. Additionally, as a non-limiting example, the center bearing bracket assembly disclosed herein may also be used in passenger vehicle, electric vehicle, hybrid vehicle, commercial vehicle, autonomous vehicles, semi-autonomous vehicles and/or heavy vehicle applications.

Figure 1:
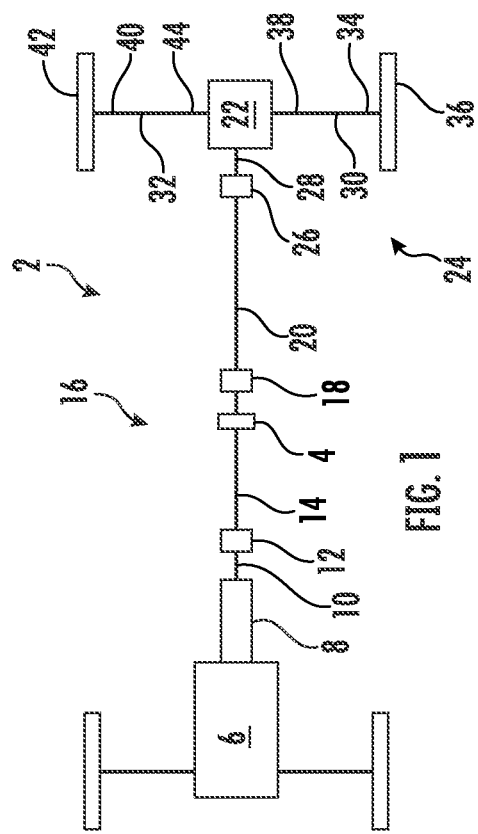
FIG. 1 is a schematic top-plan view of a vehicle having one or more center bearing assemblies according to an embodiment of the disclosure.

FIG. 1 is a schematic top-plan view of a vehicle 2 having one or more center bearing assemblies 4 according to an embodiment of the disclosure. The vehicle 2 has an engine 6 which is drivingly connected to an end of a transmission 8. A transmission output shaft 10 is drivingly connected to an end of the transmission 8 opposite the engine 6. The transmission 8 is a power management system which provides controlled application of the rotational power generated by the engine 6 by means of a gear box.

An end of the transmission output shaft 10 opposite the transmission 8 is drivingly connected to an end of a first joint assembly 12. The first joint assembly 12 is a joint or coupling assembly that allows rotational energy to be transferred between shafts having a variable axis. It is within the scope of this disclosure and as a non-limiting example that the first joint assembly 12 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

Drivingly connected to an end of the first joint assembly 12, opposite the transmission output shaft 10, is a first shaft 14. It is within the scope of this disclosure and as a non-limiting example that the first shaft 14 may be a propeller shaft, a drive shaft, a cardan shaft, a double cardan shaft, a universal joint shaft, a Hooke's joint shaft or any other shaft in a drivetrain assembly 16 that is used to transmit the rotational energy generated by the engine 6 to the drive wheel(s) of the vehicle 2. An end of the first shaft 14, opposite the first joint assembly 12, may be drivingly connected to a second joint assembly 18. As a non-limiting example, the second joint assembly 18 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

As illustrated in FIG. 1 of the disclosure and as a non-limiting example, at least a portion of an end of the first shaft 14, opposite the first joint assembly 12, may be supported by the one or more center bearing assemblies 4 according to an embodiment of the disclosure. The one or more center bearing assemblies 4 provide an amount of radial and axial support for at least a portion of the first shaft 14 of the drivetrain assembly 16, while at the same time providing rotational support for the first shaft 14 of the vehicle 2. It is therefore to be understood that the one or more center bearing assemblies 4 aid in increasing the overall life and durability of the various components of the drivetrain assembly 16 of the vehicle 2.

Drivingly connected to an end of the second joint assembly 18, opposite the first shaft 14, is an end of a second shaft 20 of the drivetrain assembly 16 of the vehicle 2. It is within the scope of this disclosure and as a non-limiting example that the second shaft 20 may be a propeller shaft, a drive shaft, a cardan shaft, a double cardan shaft, a universal joint shaft, a Hooke's joint shaft or any other shaft in a drivetrain assembly 16 that is used to transmit the rotational energy generated by the engine 6 to the drive wheel(s) of the vehicle 2. An end of the second shaft 20, opposite the second joint assembly 18, may be drivingly connected to at least a portion of a rear axle differential assembly 22 of a rear axle system 24 of the vehicle 2. The rear axle differential assembly 22 is a set of gears that allows the outer drive wheel(s) to rotate at a faster rate than the inner drive wheel(s) of the vehicle 2.

According to an embodiment of the disclosure and as a non-limiting example, at least a portion of the end of the second shaft 20, opposite the second joint assembly 18, may be drivingly connected to a third joint assembly 26 which in turn is drivingly connected to at least a portion of the rear axle differential assembly 22 of the vehicle 2. As illustrated in FIG. 1 of the disclosure and as a non-limiting example, at least a portion of an end of a third shaft 28 may drivingly connect an end of the third joint assembly 26, opposite the second shaft 20. Additionally, as illustrated in FIG. 1 of the disclosure and as a non-limiting example, at least a portion of an end of the third shaft 28, opposite the third joint assembly 26, may be drivingly connected to at least a portion of the rear axle differential assembly 22 of the vehicle 100. It is within the scope of this disclosure and as a non-limiting example that the third shaft 28 may be a differential input shaft, a rear axle system input shaft, a pinion gear shaft or any other type of shaft that provides an amount of rotational power to the rear axle differential assembly 22 of the vehicle 2. Additionally, it is within the scope of this disclosure and as a non-limiting example that the third joint assembly 26 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

In accordance with an embodiment of the disclosure and as a non-limiting example, the drivetrain assembly 16 may include one or more second center bearing assemblies (not shown) according to an embodiment of the disclosure. The one or more second center bearing assemblies (not shown) of the drivetrain assembly 16 of the vehicle 2 may be in direct contact with and provide support for an end of the second shaft 20, opposite the third joint assembly 26. The one or more second center bearing assemblies (not shown) provide an amount of radial and axial support for at least a portion of the second shaft 20 of the drivetrain assembly 16, while at the same time provide rotational support for the second shaft 20. It is within the scope of this disclosure and as a non-limiting example that the one or more second center bearing assemblies (not shown) may be used in combination with or in place of the one or more center bearing assemblies 4 illustrated in FIG. 1 of the disclosure.

The rear axle system 24 of the vehicle 2 further includes a first rear axle half shaft 30 and a second rear axle half shaft 32. The first rear axle half shaft 30 extends substantially perpendicular to the third shaft 28. At least a portion of a first end portion 34 of the first rear axle half shaft 30 may be drivingly connected to at least a portion of a first rear axle wheel end assembly 36 and at least a portion of a second end portion 38 of the first rear axle half shaft 30 may be drivingly connected to a side of the rear axle differential assembly 22.

Extending substantially perpendicular to the third shaft 28 is the second rear axle half shaft 32 of the vehicle 2. At least a portion of a first end portion 40 of the second rear axle half shaft 32 may be drivingly connected to at least a portion of a second rear axle wheel end assembly 42. Additionally, at least a portion of a second end portion 44 of the second rear axle half shaft 32 may be drivingly connected to an end of the rear axle differential assembly 22, opposite the first rear axle half shaft 30 of the vehicle 2.

It is within the scope of this disclosure and as a non-limiting example that the one or more center bearing assemblies 4 and/or the one or more second center bearing assemblies (not shown) may include a center bearing bracket assembly (not shown) according to an embodiment of the disclosure.

Figure 2:
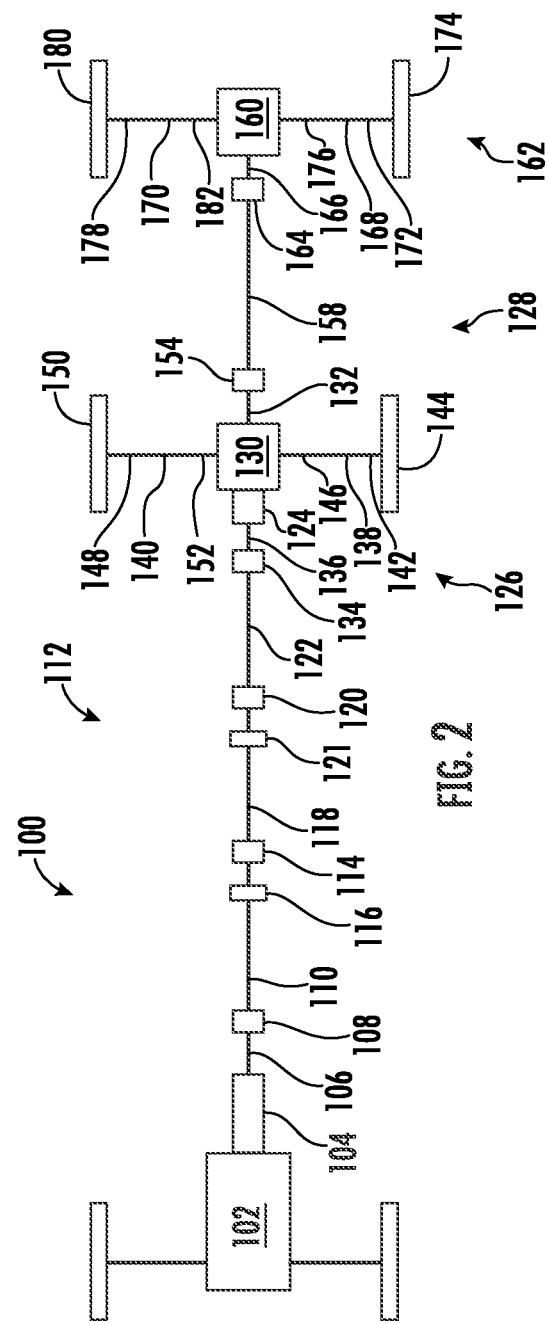
FIG. 2 is a schematic top-plan view of another vehicle having one or more center bearing assemblies according to an embodiment of the disclosure.

FIG. 2 is a schematic top-plan view of another vehicle 100 having one or more center bearing assemblies according to an embodiment of the disclosure. As illustrated in FIG. 2 of the disclosure and as a non-limiting example, the vehicle 100 has an engine 102 which is drivingly connected to an end of a transmission 104. A transmission output shaft 106 is drivingly connected to an end of the transmission 104, opposite the engine 102. The transmission 104 is a power management system which provides controlled application of the rotational power generated by the engine 102 by means of a gear box.

At least a portion of an end of the transmission output shaft 106, opposite the transmission 104, may be drivingly connected to an end of a first joint assembly 108. The first joint assembly 108 is a joint or coupling assembly that allows rotational energy to be transferred between shafts having a variable axis. In a non-limiting example, the first joint assembly 108 may be a universal coupling, a U-joint, a cardan joint, a double cardan joint, a Spicer joint, a Hardy Spicer Joint or a Hooke's joint Drivingly connected to an end of the first joint assembly 108, opposite the transmission output shaft 106, is an end of a first shaft 110. It is within the scope of this disclosure and as a non-limiting example that the first shaft 110 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the first shaft 110, opposite the first joint assembly 108, may be drivingly connected to a second joint assembly 114 of the vehicle 100. As a non-limiting example, the second joint assembly 114 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

As illustrated in FIG. 2 of the disclosure and as a non-limiting example, at least a portion of an end of the first shaft 110, opposite the first joint assembly 108, may be supported by one or more first center bearing assemblies 116 according to an embodiment of the disclosure. The one or more first center bearing assemblies 116 provide an amount of radial and axial support for at least a portion of the first shaft 110 of the drivetrain assembly 112, while at the same time providing rotational support for the first shaft 110 of the vehicle 100. It is therefore to be understood that the one or more first center bearing assemblies 116 aid in increasing the overall life and durability of the various components of the drivetrain assembly 112 of the vehicle 100.

Drivingly connected to an end of the second joint assembly 114, opposite the first shaft 110, is an end of a second shaft 118 of the drivetrain assembly 112 of the vehicle 100. It is within the scope of this disclosure and as a non-limiting example that the second shaft 118 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the second shaft 118, opposite the second joint assembly 114, may be drivingly connected to at least a portion of a third joint assembly 120. As a non-limiting example, the third joint assembly 120 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

At least a portion of an end of the third joint assembly 120 is drivingly connected to an end of a third shaft 122. It is within the scope of this disclosure and as a non-limiting example that the third shaft 122 may be a drive shaft, a propeller shaft or a prop shaft. An end of the third shaft 122, opposite the third joint assembly 120, may be drivingly connected to at least a portion of an inter-axle differential assembly 124 of a forward tandem axle system 126 of a rear tandem axle system 128 of the vehicle 100. The inter-axle differential assembly 124 is a device that divides the rotational power generated by the engine 102 between the axles in the vehicle 100.

In accordance with the embodiment illustrated in FIG. 2 of the disclosure and as a non-limiting example, at least a portion of an end of the second shaft 118, adjacent to the third joint assembly 120, may be supported by one or more second center bearing assemblies 121 according to an embodiment of the disclosure. The one or more second center bearing assemblies 121 provide an amount of radial and axial support for at least a portion of the second shaft 118 of the drivetrain assembly 112, while at the same time providing rotational support for the second shaft 118 of the vehicle 100. It is therefore to be understood that the one or more second center bearing assemblies 121 aid in increasing the overall life and durability of the various components of the drivetrain assembly 112 of the vehicle 100. As illustrated in FIG. 2 of the disclosure and as a non-limiting example, the inter-axle differential assembly 124 may be drivingly connected to a forward tandem axle differential assembly 130 and a forward tandem axle system output shaft 132. The forward tandem axle differential assembly 130 is a set of gears that allows the outer drive wheel(s) to rotate at a faster rate than the inner drive wheel(s) of the vehicle 100.

According to an embodiment of the disclosure and as a non-limiting example, at least a portion of the end of the third shaft 122, opposite the third joint assembly 120, may be drivingly connected to a fourth joint assembly 134 which in turn is drivingly connected to at least a portion of the inter-axle differential assembly 124 of the vehicle 100. As illustrated in FIG. 2 of the disclosure and as a non-limiting example, at least a portion of an end of a fourth shaft 136 may drivingly connected to at least a portion of an end of the fourth joint assembly 134, opposite the third shaft 122. Additionally, as illustrated in FIG. 2 of the disclosure and as a non-limiting example, at least a portion of an end of the fourth shaft 136, opposite the fourth joint assembly 134, may be drivingly connected to at least a portion of the inter-axle differential assembly 124 of the vehicle 100. It is within the scope of this disclosure and as a non-limiting example that the fourth shaft 136 may be an inter-axle differential input shaft, a differential input shaft, a forward tandem axle system input shaft, a pinion gear shaft or any other type of shaft that provides an amount of rotational power to the inter-axle differential assembly 124 and the forward tandem axle differential assembly 130 of the vehicle 100. Additionally, it is within the scope of this disclosure and as a non-limiting example that the fourth joint assembly 134 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

In accordance with the embodiment illustrated in FIG. 2 and as a non-limiting example, the forward tandem axle system 126 further includes a first forward tandem axle half shaft 138 and a second forward tandem axle half shaft 140. At least a portion of a first end portion 142 of the first forward tandem axle half shaft 138 may be drivingly connected to at least a portion of a first forward tandem axle wheel end assembly 144 and at least a portion of a second end portion 146 of the first forward tandem axle half shaft 138 may be drivingly connected to a side of the forward tandem axle differential assembly 130 of the vehicle 100.

Extending substantially perpendicular to the fourth shaft 136 is the second forward tandem axle half shaft 140 of the vehicle 100. At least a portion of a first end portion 148 of the second forward tandem axle half shaft 140 may be drivingly connected to at least a portion of a second forward tandem axle wheel end assembly 150. Additionally, at least a portion of a second end portion 152 of the second forward tandem axle half shaft 140 may be drivingly connected to an end of the forward tandem axle differential assembly 130, opposite the first forward tandem axle half shaft 138 of the vehicle 100.

At least a portion of an end of the forward tandem axle system output shaft 132 is drivingly connected to a side of the inter-axle differential assembly 124, opposite the fourth shaft 136. Drivingly connected to at least a portion of an end of the forward tandem axle system output shaft 132, opposite the inter-axle differential assembly 124, is a fifth joint assembly 154. It is within the scope of this disclosure and as a non-limiting example that the fifth joint assembly 154 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

At least a portion of an end of the fifth joint assembly 154, opposite forward tandem axle system output shaft 132, may be drivingly connected to at least a portion of an end of a fifth shaft 158 of the drivetrain assembly 112. It is within the scope of this disclosure and as a non-limiting example that the fifth shaft 158 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the fifth shaft 158, opposite the fifth joint assembly 154, may be drivingly connected to at least a portion of a rear tandem axle differential assembly 160 of a rear tandem axle system 162 of the rear tandem axle system 128 of the vehicle 100. The rear tandem axle differential assembly 160 is a set of gears that allows the outer drive wheel(s) to rotate at a faster rate than the inner drive wheel(s) of the vehicle 100.

In accordance with an embodiment of the disclosure and as a non-limiting example, at least a portion of the end of the fifth shaft 158, opposite the fifth joint assembly 154, may be drivingly connected to a sixth joint assembly 164 which in turn is drivingly connected to at least a portion of the rear tandem axle differential assembly 160 of the vehicle 100. As illustrated in FIG. 2 of the disclosure and as a non-limiting example, at least a portion of an end of a sixth shaft 166 may drivingly connected to at least a portion of an end of the sixth joint assembly 164, opposite the fifth shaft 158. Additionally, as illustrated in FIG. 2 and as a non-limiting example, at least a portion of an end of the sixth shaft 166, opposite the sixth joint assembly 166, may be drivingly connected to at least a portion of the rear tandem axle differential assembly 160 of the vehicle 100. It is within the scope of this disclosure and as a non-limiting example that the sixth shaft 166 may be a differential input shaft, a rear tandem axle system input shaft, a pinion gear shaft or any other type of shaft that provides an amount of rotational power to the rear tandem axle differential assembly 160 of the vehicle 100. Additionally, it is within the scope of this disclosure and as a non-limiting example that the sixth joint assembly 164 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

The rear tandem axle system 162 of the vehicle 100 further includes a first rear tandem axle half shaft 168 and a second rear tandem axle half shaft 170. The first rear tandem axle half shaft 168 extends substantially perpendicular to the sixth shaft 166. At least a portion of a first end portion 172 of the first rear tandem axle half shaft 168 may be drivingly connected to at least a portion of a first rear tandem axle wheel end assembly 174 and at least a portion of a second end portion 176 of the first rear tandem axle half shaft 168 may be drivingly connected to a side of the rear tandem axle differential assembly 160.

Extending substantially perpendicular to the sixth shaft 166 is the second rear tandem axle half shaft 170 of the vehicle 100. At least a portion of a first end portion 178 of the second rear tandem axle half shaft 170 may be drivingly connected to at least a portion of a second rear tandem axle wheel end assembly 180. Additionally, at least a portion of a second end portion 182 of the second rear tandem axle half shaft 170 may be drivingly connected to an end of the rear tandem axle differential assembly 160, opposite the first rear tandem axle half shaft 168 of the vehicle 100.

In accordance with an embodiment of the disclosure and as a non-limiting example, the drivetrain assembly 112 may include one or more third center bearing assemblies (not shown) according to an embodiment of the disclosure. The one or more third center bearing assemblies (not shown) of the drivetrain assembly 112 of the vehicle 100 may be in direct contact with and provide support for an end of the second shaft 118, opposite the third joint assembly 120. The one or more third center bearing assemblies (not shown) provide an amount of radial and axial support for at least a portion of the second shaft 118 of the drivetrain assembly 112, while at the same time provide rotational support for the second shaft 118. It is within the scope of this disclosure and as a non-limiting example that the one or more third center bearing assemblies (not shown) may be used in combination with or in place of the one or more first center bearing assemblies 116 illustrated in FIG. 2 of the disclosure.

In accordance with a further embodiment of the disclosure and as a non-limiting example, the drivetrain assembly 112 may include one or more fourth center bearing assemblies (not shown) according to an embodiment of the disclosure. The one or more fourth center bearing assemblies (not shown) of the drivetrain assembly 112 of the vehicle 100 may be in direct contact with and provide support for an end of the third shaft 122, opposite the fourth joint assembly 134. The one or more fourth center bearing assemblies (not shown) provide an amount of radial and axial support for at least a portion of the third shaft 122 of the drivetrain assembly 112, while at the same time provide rotational support for the third shaft 122. It is within the scope of this disclosure and as a non-limiting example that the one or more fourth center bearing assemblies (not shown) may be used in combination with or in place of the one or more second center bearing assemblies 121 illustrated in FIG. 2 of the disclosure.

It is within the scope of this disclosure and as a non-limiting example that the one or more first center bearing assemblies 116, the one or more second center bearing assemblies 121, the one or more third center bearing assemblies (not shown), and/or the one or more fourth center bearing assemblies (not shown) may include a center bearing bracket assembly (not shown) according to an embodiment of the disclosure.

Figure 3:
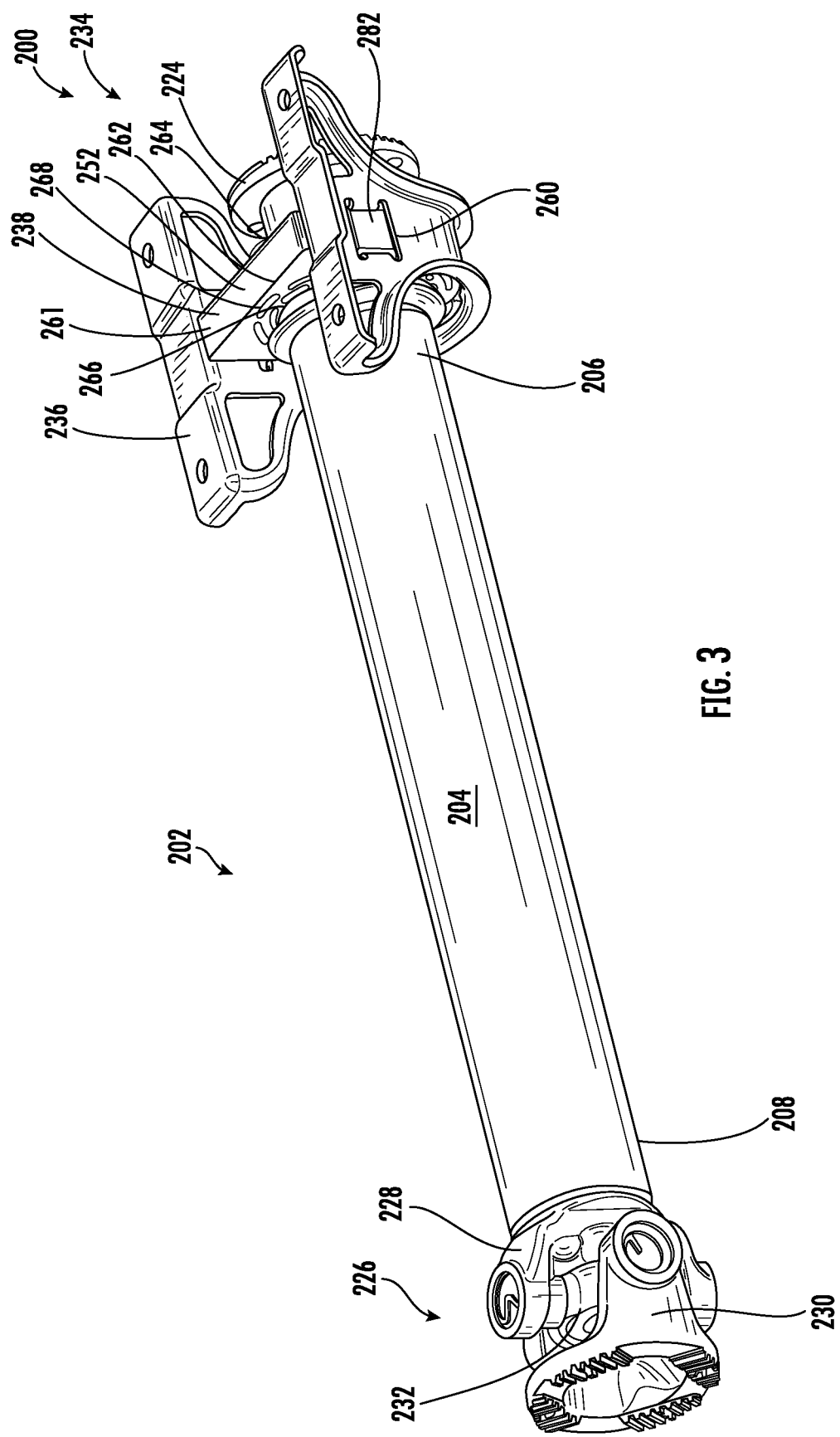
FIG. 3 is a schematic perspective view of a first side of a portion of a center bearing bracket assembly according to an embodiment of the disclosure.
Figure 4:
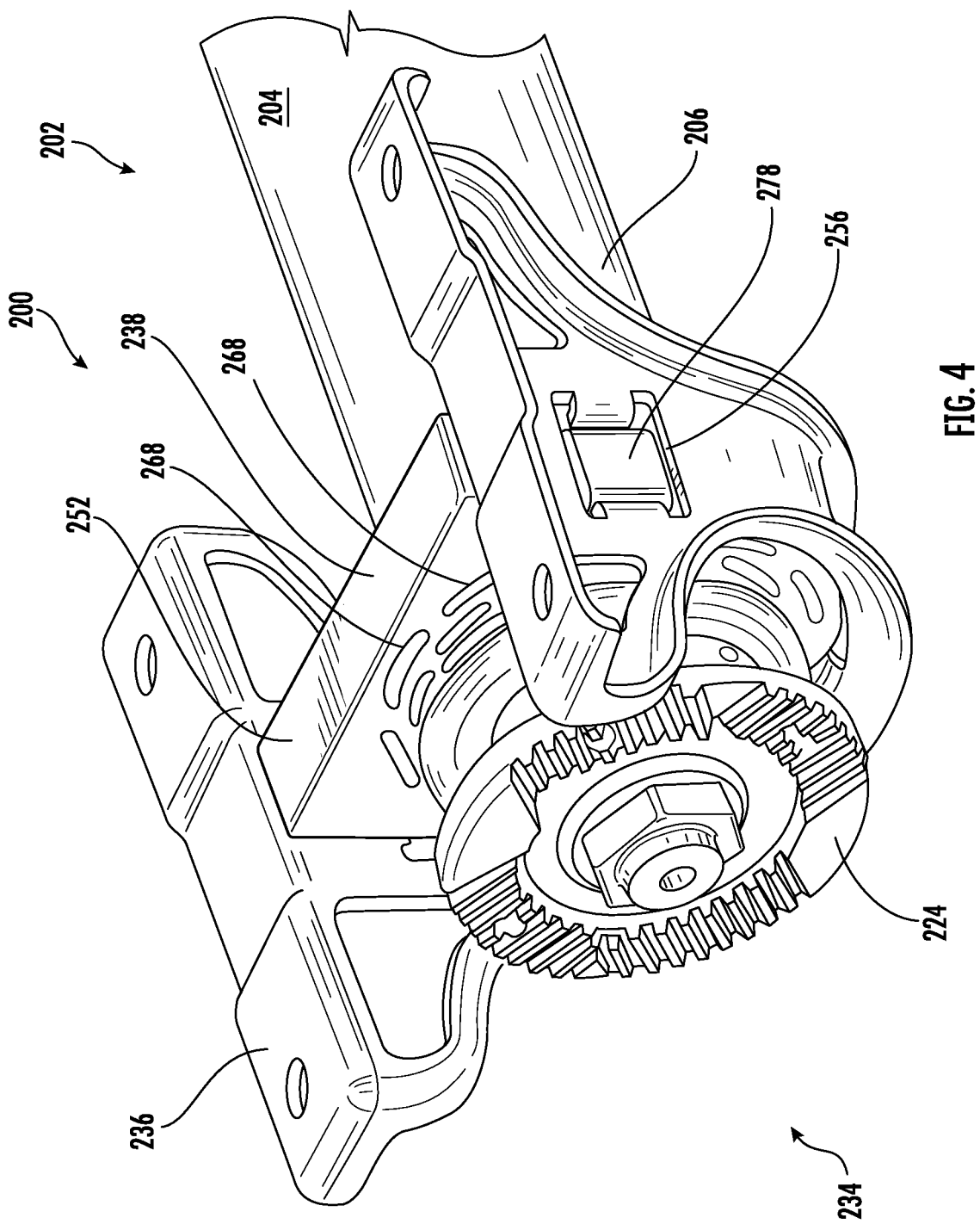
FIG. 4 is a schematic perspective view of a second side of a portion of the center bearing bracket assembly according to the embodiment of the disclosure illustrated in FIG. 3 of the disclosure.

FIGS. 3-11 provide a schematic illustration of a center bearing bracket assembly 200 according to an embodiment of the disclosure for use in a driveline 202 of a vehicle (not shown). As best seen in FIG. 3 of the disclosure and as a non-limiting example, the driveline 202 of the vehicle (not shown) includes a shaft 204 having a first end portion 206 and a second end portion 208. It is within the scope of this disclosure and as a non-limiting example that the first shaft 204 may be an input shaft, an output shaft, a prop shaft, a propeller shaft, a drive shaft, an axle half shaft, a transmission output shaft, a transfer case output shaft, an axle assembly input shaft, or an axle assembly output shaft.

Figure 8:
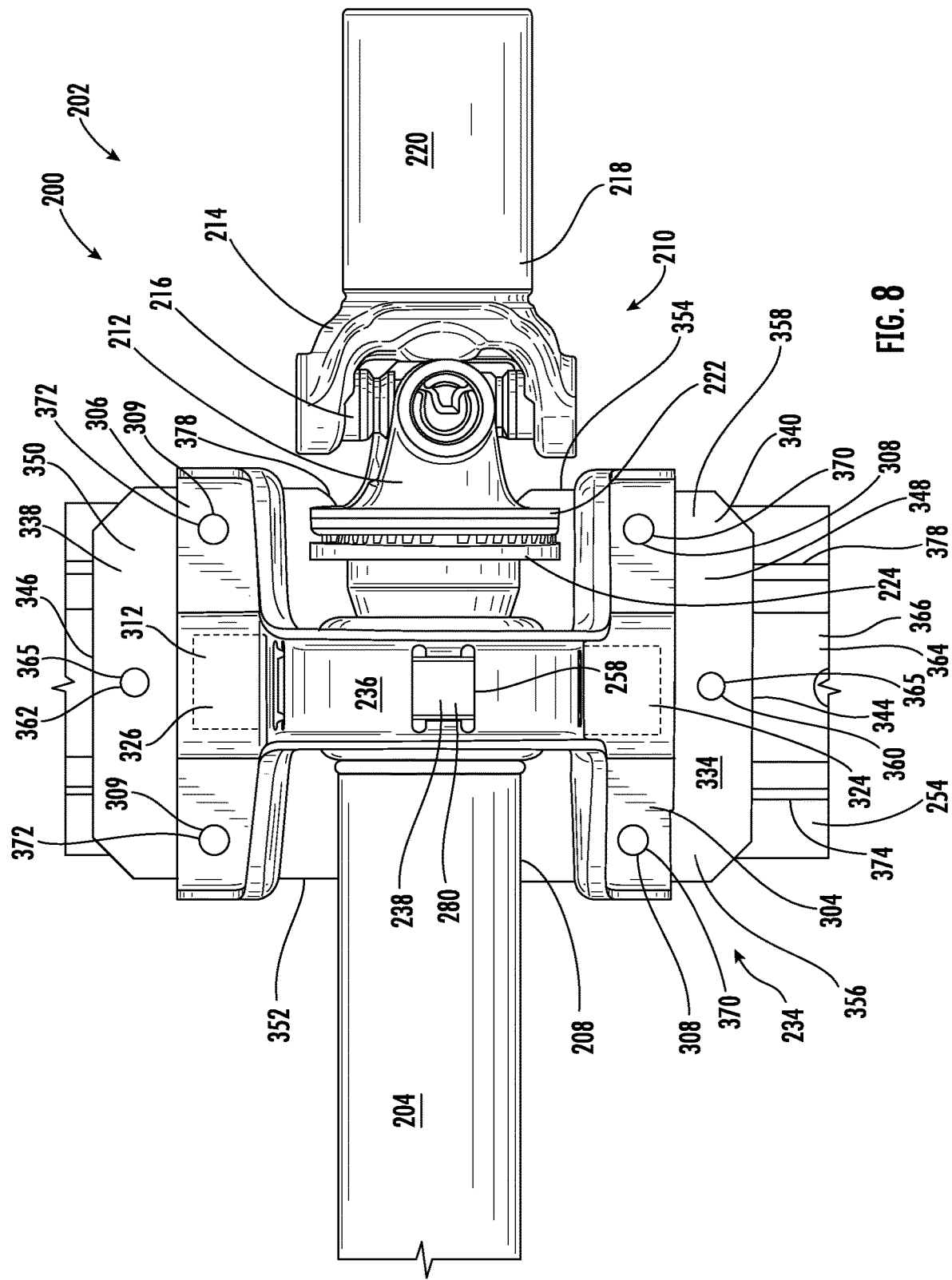
FIG. 8 is a schematic bottom plan view of a portion of the center bearing bracket assembly according to the embodiment of the disclosure illustrated in FIGS. 3-7 of the disclosure.
Figure 10:
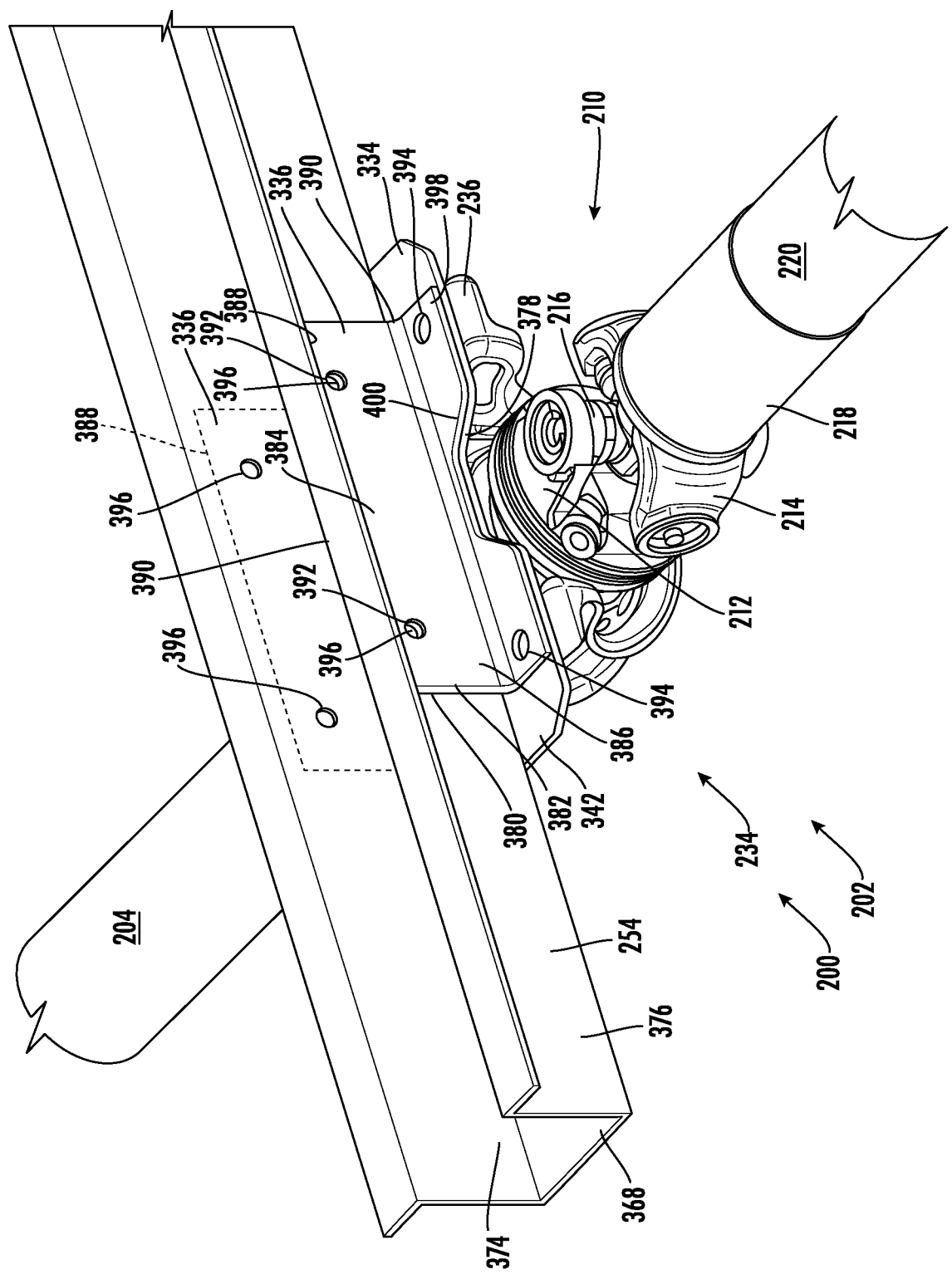
FIG. 10 is a schematic perspective view of a portion of the center bearing bracket assembly according to the embodiment of the disclosure illustrated in FIGS. 3-9 of the disclosure.

Drivingly connected to at least a portion of the first end portion 206 of the first shaft 204 is a first joint assembly 210. As best seen in FIGS. 8 and 10 of the disclosure and as a non-limiting example, the first joint assembly 210 may include a first joint member 212 that is drivingly connected to a second joint member 214 by a third joint member 216. It is within the scope of this disclosure and as a non-limiting example that the first joint assembly 210 may be a constant velocity joint assembly, a homokinetic joint assembly, a CV joint assembly, a universal joint assembly, a universal coupling, a Cardan joint assembly, a Spicer joint assembly, a Hardy Spicer joint assembly, or a Hooke's joint assembly.

In accordance with the embodiment illustrated in FIGS. 8 and 10 and as a non-limiting example, the first joint assembly 210 may be a universal joint assembly. As a result, it is within the scope of this disclosure and as a non-limiting example that the first joint member 212 may be a first yoke member, the second joint member 214 may be a second yoke member, and the third joint member 216 may be a journal cross.

As best seen in FIG. 8 and as a non-limiting example, at least a portion of the first joint member 212 of the first joint assembly 210 may be drivingly connected to at least a portion of the first end portion 208 of the first shaft 204. In accordance with the embodiment illustrated in FIG. 8 of the disclosure and as a non-limiting example, the first joint member 212 of the first joint assembly 210 may include a connector portion 222 that is drivingly connected to a connector portion 224 of the first shaft 204. It is within the scope of this disclosure and as a non-limiting example that the connection between the connector 222 of the first joint assembly 210 and the connector 224 of the first shaft 204 may be a spline connection or a face spline type of connection.

Additionally, as best seen in FIG. 8 and as a non-limiting example, at least a portion of the second joint member 214 may be drivingly connected to at least a portion of a first end portion 218 of a second shaft 220. It is within the scope of this disclosure and as a non-limiting example that the second shaft 220 may be an input shaft, an output shaft, a prop shaft, a propeller shaft, a drive shaft, an axle half shaft, a transmission output shaft, a transfer case output shaft, an axle assembly input shaft, or an axle assembly output shaft.

At least a portion of a second joint assembly 226 may be drivingly connected to at least a portion of the second end portion 208 of the first shaft 204. As best seen in FIG. 3 and as a non-limiting example, the second joint assembly 226 may include a first joint member 228 that is drivingly connected to a second joint member 230 by one or more third joint members 232. It is within the scope of this disclosure and as a non-limiting example that the second joint assembly 232 may be a constant velocity joint assembly, a homokinetic joint assembly, a CV joint assembly, a universal joint assembly, a universal coupling, a Cardan joint assembly, a Spicer joint assembly, a Hardy Spicer joint assembly, or a Hooke's joint assembly.

In accordance with the embodiment illustrated in FIG. 3 and as a non-limiting example, the second joint assembly 226 may be a universal joint assembly. As a result, it is within the scope of this disclosure and as a non-limiting example that the first joint member 228 may be a first yoke member, the second joint member 230 may be a second yoke member, and the third joint member 232 may be a journal cross.

As best seen in FIG. 3 of the disclosure and as a non-limiting example, the driveline 202 of the vehicle (not shown) may include a center bearing assembly 234. It is within the scope of this disclosure and as a non-limiting example that the center bearing assembly 234 may include a first center bearing bracket 236, a center bearing cushion 238, and one or more bearing assemblies (not shown). The first center bearing bracket 236 may be of a size and shape to receive and/or retain at least a portion of the center bearing cushion 238 therein.

Additionally, as best seen in FIG. 3 and as a non-limiting example, the center bearing cushion 238 has a body portion 261 having a first side 262, a second side 264, and an outer peripheral surface 252. Extending from the first side 262 to the second side 264 of the body portion 261 of the center bearing cushion 238 is a bearing aperture 266. The bearing aperture 266 in the body portion 261 of the center bearing cushion 238 may be of a size and shape to receive and/or retain at least a portion of a bearing assembly (not shown) therein. The bearing assembly (not shown) may include an inner race (not shown) that is connected to at least a portion of the first end portion 206 of the first shaft 204, an outer race (not shown) that is secured within at least a portion of the bearing aperture 266, and one or more rolling elements (not shown) interposed between the inner and outer races (not shown) of the bearing assembly (not shown). As a result, it is therefore to be understood that the bearing assembly (not shown) provides an amount of rotational support for the first shaft 204 and/or the second shaft 220 of the driveline 202. The center bearing cushion 238 of the center bearing assembly 234 provides an amount of support for at least a portion of the bearing assembly (not shown), the first shaft 204, the second shaft 220, and/or the joint assembly 210 of the driveline 202. Additionally, the center bearing cushion 238 aids in reducing the overall amount of NVH experienced by the driveline 202. It is within the scope of this disclosure and as a non-limiting example that the center bearing cushion 238 of the center bearing assembly 234 may be made of a resilient material such as but not limited to an elastomeric material, a rubber material, a polymeric material and/or a composite composition.

Extending from at least a portion of the first side 262 to the second side 264 of the body portion 261 of the center bearing cushion 238 of the center bearing assembly 234 is one or more slots 268. The one or more slots 268 aid in providing an amount of additional flexibility and NVH reduction capability to the center bearing cushion 238 of the center bearing assembly 234. As best seen in FIG. 3 of the disclosure and as a non-limiting example, the one or more slots 268 may be disposed radially around the bearing aperture 266 in the center bearing cushion 238 of the center bearing assembly 234. It is within the scope of this disclosure and as a non-limiting example that the one or more slots 268 in the center bearing cushion 238 may be substantially cylindrical and/or substantially arcuate in shape.

Figure 6:
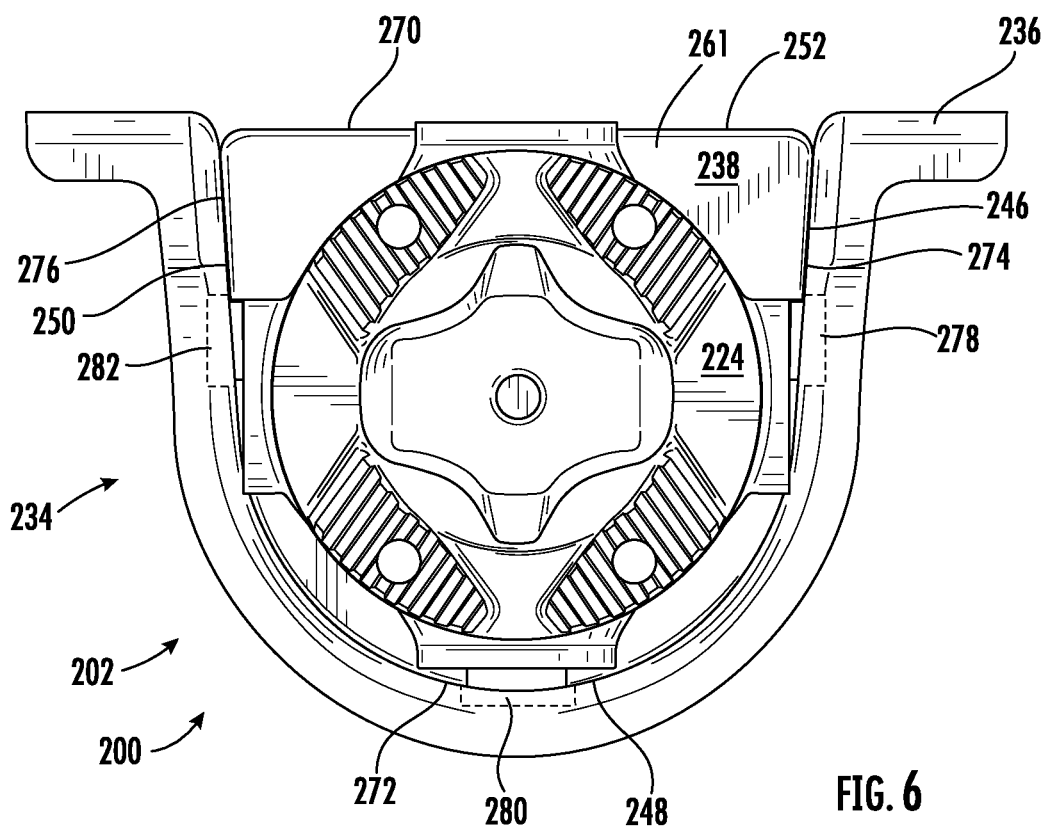
FIG. 6 is a schematic front plan view of a portion of the center bearing bracket assembly according to the embodiment of the disclosure illustrated in FIGS. 3-5 of the disclosure.
Figure 7:
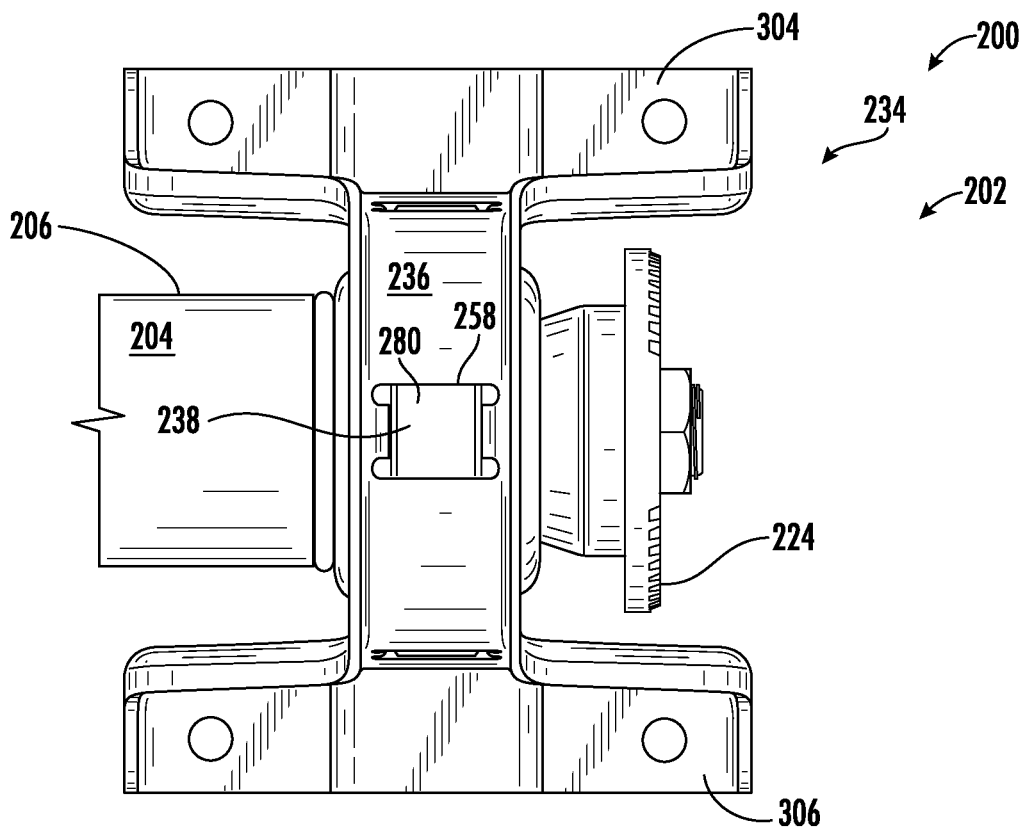
FIG. 7 is a schematic bottom plan view of a portion of the center bearing bracket assembly according to the embodiment of the disclosure illustrated in FIGS. 3-6 of the disclosure.
Figure 9:
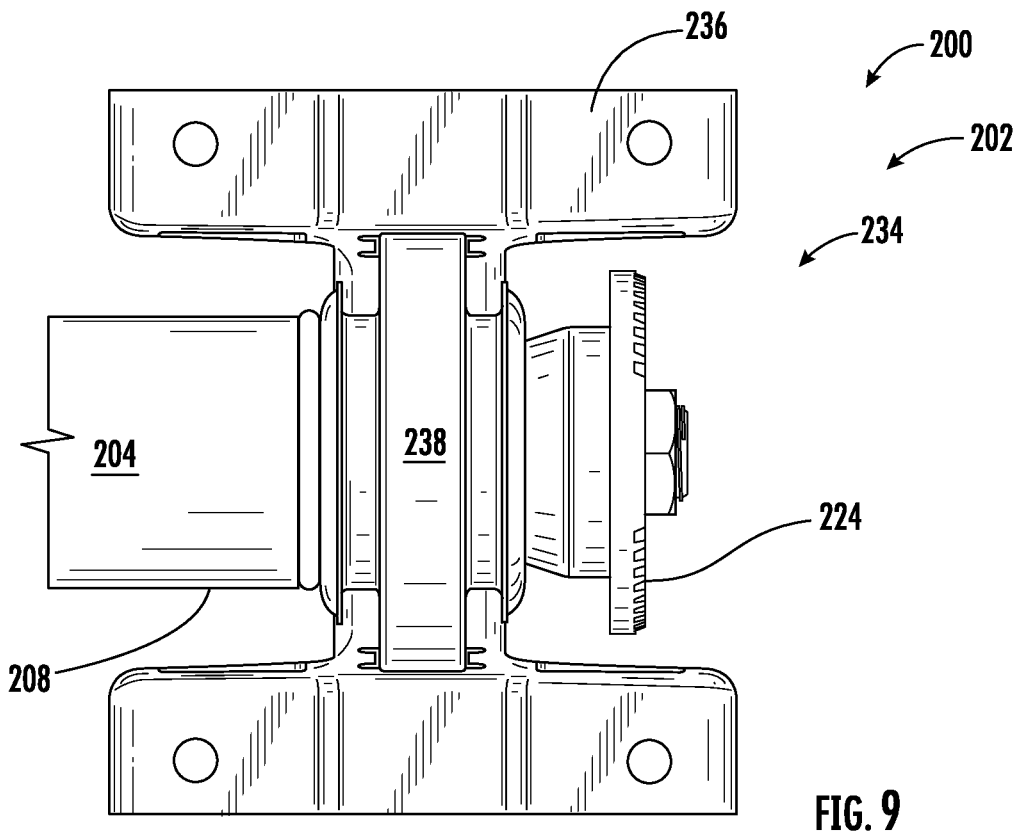
FIG. 9 is a schematic top plan view of a portion of the center bearing bracket assembly according to the embodiment of the disclosure illustrated in FIGS. 3-8 of the disclosure.

In accordance with the embodiment illustrated in FIG. 6 and as a non-limiting example, the outer peripheral surface 252 of the center bearing cushion 238 may have a top portion 270, a bottom portion 272, a first side portion 274, and a second side portion 276. As best seen in FIG. 6 and as a non-limiting example, the top portion 270 of the outer peripheral surface 252 of the center bearing cushion 238 may have a substantially flat or linear in cross-sectional shape and the bottom portion 272 of the outer peripheral surface 252 of the center bearing cushion 238 may have a substantially arcuate cross-sectional shape. Additionally as best seen in FIG. 6 and as a non-limiting example, the first and second side portions 274 and 276 of the outer peripheral surface 252 of the center bearing cushion 238 may be have a substantially linear cross-sectional shape and may extend substantially parallel relative to each other. It is within the scope of this disclosure and as a non-limiting example that the first and second side portions 274 and 276 of the outer peripheral surface 252 of the center bearing cushion 238 may extend substantially perpendicular to the top portion 270 of the outer peripheral surface 252 of the center bearing cushion 238. The first and second side portions 274 and 276 of the outer peripheral surface 252 of the center bearing cushion 238 extend outward from opposing ends of the bottom portion 272 of the outer peripheral surface 252 of the center bearing cushion 238 toward the top portion 270 of the outer peripheral surface 252 of the center bearing cushion 238. As a result, it is therefore to be understood that the first and second side portions 274 and 276 connect the bottom portion 272 to the top portion 270 of the outer peripheral surface 252 of the center bearing cushion 238.

The center bearing cushion 238 of the center bearing assembly 234 may include one or more first cushion retention members 278, one or more second cushion retention members 280, and/or one or more third cushion retention members 282. The one or more first, second, and/or third cushion retention members 278, 280, and/or 282 may extend outward from at least a portion of the outer peripheral surface 252 of the center bearing cushion 238. The one or more first, second, and/or third cushion retention members 278, 280, and/or 282 may interact with at least a portion of the first center bearing bracket 236 to aid in securing the center bearing cushion 238 relative to the center bearing bracket 238 when installed within the driveline 202 of the vehicle (not shown). This aids in reducing the overall amount of movement and therefore frictional interaction between the center bearing cushion 238 and the first center bearing bracket 236 when the vehicle (not shown) is in operation. As a result, this aids in improving the overall life and durability of the center bearing assembly 234 of the driveline 202 of the vehicle (not shown).

According to an embodiment of the disclosure and as a non-limiting example, at least a portion of the one or more first cushion retention members 278 may extend outward from at least a portion of the first side portion 274 of the outer peripheral surface 252 of the center bearing cushion 238. Additionally, according to an embodiment of the disclosure and as a non-limiting example, at least a portion of the one or more second cushion retention members 280 may extend outward from at least a portion of the bottom portion 272 of the outer peripheral surface 252 of the center bearing cushion 238. Furthermore, according to an embodiment of the disclosure and as a non-limiting example, at least a portion of the one or more third cushion retention members 282 may extend outward from at least a portion of the second side portion 276 of the outer peripheral surface 252 of the center bearing cushion 238.

Figure 5:
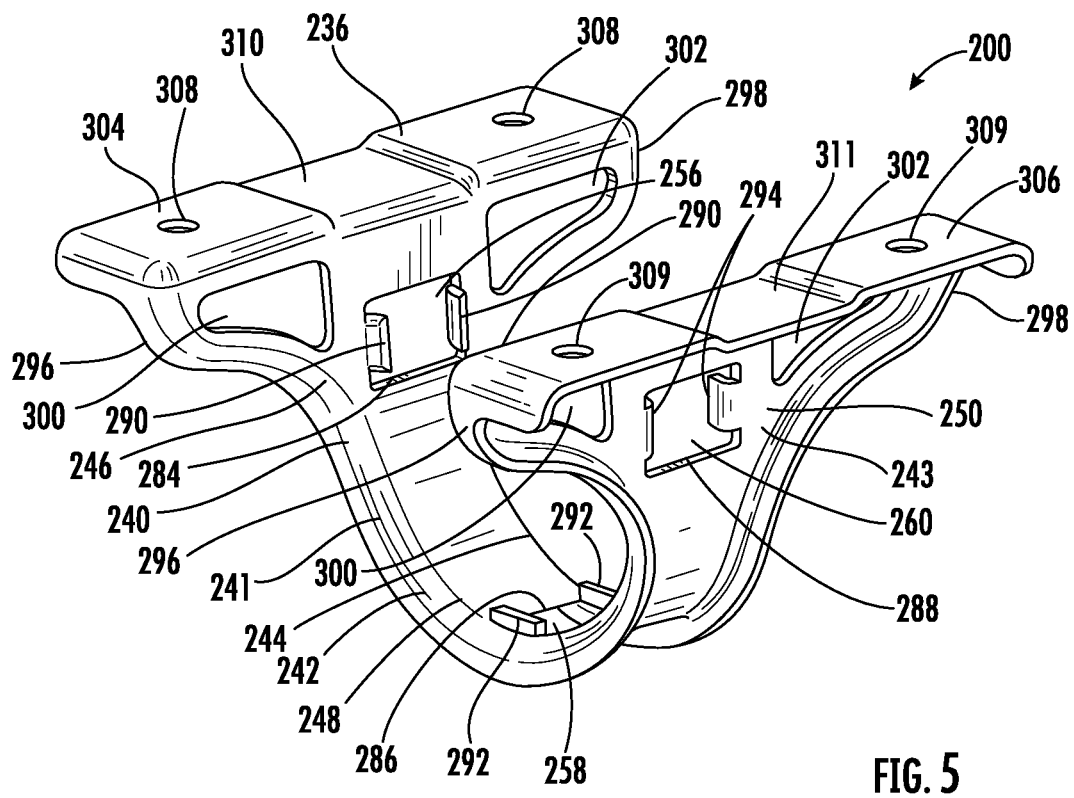
FIG. 5 is a schematic perspective view of a first center bearing bracket of the center bearing bracket assembly according to the embodiment of the disclosure illustrated in FIGS. 3 and 4 of the disclosure.

As best seen in FIG. 5 of the disclosure and as a non-limiting example, the first center bearing bracket 236 has a body portion 240 having an inner surface 241, an outer surface 243, a first side 242, a second side 244, a first portion 246, a second portion 248, and a third portion 250. The first center bearing bracket 236 may be used in order to aid in securing the center bearing assembly 234 to at least a portion of a body or frame 254 of the vehicle (not shown). At least a portion of the inner surface 241 of the body portion 240 of the first center bearing bracket 236 may have a shape that is complementary to at least a portion of the outer peripheral surface 252 of the center bearing cushion 238 of the center bearing assembly 234. It is within the scope of this disclosure and as a non-limiting example that the first center bearing bracket 236 may be made of a structurally rigid material such as but not limited to a metallic material, a composite material, or a polymeric material. Additionally, it is within the scope of this disclosure and as a non-limiting example that the body portion 240 of the first center bearing bracket 236 may have a substantially U-shaped cross-sectional shape.

In accordance with the embodiment illustrated in FIGS. 5 and 6 and as a non-limiting example, at least a portion of the first portion 246 of the body portion 240 of the first center bearing bracket 236 may have a shape that is complementary to the shape of the first side portion 274 of the outer peripheral surface 252 of the center bearing cushion 238. Additionally, according to the embodiment illustrated in FIGS. 5 and 6 and as a non-limiting example, at least a portion of the second portion 248 of the body portion 240 of the first center bearing bracket 236 may have a shape that is complementary to the shape of the bottom portion 272 of the outer peripheral surface 252 of the center bearing cushion 238. Furthermore, according to the embodiment illustrated in FIGS. 5 and 6 and as a non-limiting example, at least a portion of the third portion 250 of the body portion 240 of the first center bearing bracket 236 may have a shape that is complementary to the shape of the second side portion 276 of the outer peripheral surface 252 of the center bearing cushion 238.

At least a portion of the first portion 246 of the body portion 240 of the first center bearing bracket 236 and the third portion 250 of the body portion 240 of the first center bearing bracket 236 may extend away from and outward from opposing ends of the second portion 248 of the body portion 240 of the first center bearing bracket 236. As a result, it is therefore to be understood that the second portion 248 of the body portion 240 of the first center bearing bracket 236 provides a connection between the first and third portions 246 and 250 of the body portion 240 of the first center bearing bracket 236. It is within the scope of this disclosure and as a non-limiting example, that the first and second portions 246 and 250 of the body portion 240 of the first center bearing bracket 236 may have a substantially linear cross-sectional shape and the second portion 248 of the body portion 240 of the first center bearing bracket 236 may be substantially arcuate cross sectional shape. It is within the scope of this disclosure and as a non-limiting example, that the first and second portions 246 and 250 of the body portion 240 of the first center bearing bracket 236 may have a substantially linear cross-sectional shape and the second portion 248 of the body portion 240 of the first center bearing bracket 236 may be substantially arcuate cross sectional shape. As a result, it is within the scope of this disclosure and as a non-limiting example that the first portion 246 of the body portion 240 of the first center bearing bracket 236 may extend substantially parallel to at least a portion of the third portion 250 of the body portion 240 of the first center bearing bracket 236.

The body portion 240 of the first center bearing bracket 236 may include one or more first apertures 256, one or more second apertures 258, and/or one or more third apertures 260. The one or more first, second, and/or third apertures 256, 258, 260 in the body portion 240 of the first center bearing bracket 236 may be of a size and shape to receive and/or retain at least a portion of the center bearing cushion 238 therein. As a result, it is therefore to be understood that the interaction between the center bearing cushion 238 and the one or more first, second, and/or third apertures 256, 258, 260 in the first center bearing bracket 236 may aid in securing the center bearing cushion 238 relative to the center bearing bracket 238 when the center bearing assembly 234 is installed on the vehicle (not shown). In accordance with the embodiment where the center bearing cushion 238 includes one or more first, second, and/or third cushion retention portions 278, 280, and/or 282, it is the interaction between the one or more first, second, and/or third cushion retention portions 278, 280, and/or 282 and a surface 284, 286, and/or 288 defining the one or more first, second, and/or third apertures 256, 258, 260 respectively that aids in securing the center bearing cushion 238 relative to the center bearing bracket 238 when the center bearing assembly 234 is installed on the vehicle (not shown).

According to the embodiment illustrated in FIG. 5 and as a non-limiting example, the one or more first, second, and/or third apertures 256, 258, 260 extend from the inner surface 241 to an outer surface 243 of the body portion 240 of the first center bearing bracket 236. As best seen in FIG. 5 of the disclosure and as a non-limiting example, at least a portion of the one or more first apertures 256 may be disposed in the first portion 246 of the first center bearing bracket 236, at least a portion of the one or more second apertures 258 may be disposed in the second portion 248 of the center bearing bracket 238, and at least a portion of the one or more third apertures 260 may be disposed in the third portion 250 of the center bearing bracket 238.

The one or more first apertures 256 in the body portion 240 of the first center bearing bracket 236 may include one or more first aperture retention portions 290. As best seen in FIG. 5 and as a non-limiting example, the one or more first aperture retention members 290 may extend from the surface 284 defining the one or more first apertures 256 in the first center bearing bracket 236. The one or more first aperture retention members 290 may provide a positive stop for, and may be selectively engagable with, the center bearing cushion 238 when installed within the first center bearing bracket 236. As a result, it is therefore to be understood that the one or more first aperture retention portions 290 may aid in reducing the overall amount of movement and therefore frictional interaction between the center bearing cushion 238 and the first center bearing bracket 236 when the vehicle (not shown) is in operation.

This aids in improving the overall life and durability of the center bearing assembly 234 of the driveline 202 of the vehicle (not shown). It is within the scope of this disclosure and as a non-limiting example that when the center bearing cushion 238 is installed within the first center bearing bracket 236, at least a portion of the one or first aperture retention portions 290 may be disposed outward from at least a portion of the first side 262 and/or the second side 264 of the body portion 261 of the center bearing cushion 238.

As best seen in FIG. 5 and as a non-limiting example, the one or more second apertures 258 in the body portion 240 of the first center bearing bracket 236 may include one or more second aperture retention portions 292. In accordance with the embodiment illustrated in FIG. 5 and as a non-limiting example, the one or more second aperture retention members 292 may extend from the surface 286 defining the one or more second apertures 258 in the first center bearing bracket 236. The one or more second aperture retention members 292 may provide a positive stop for, and may be selectively engagable with, the center bearing cushion 238 when installed within the first center bearing bracket 236. As a result, it is therefore to be understood that the one or more second aperture retention portions 292 may aid in reducing the overall amount of movement and therefore frictional interaction between the center bearing cushion 238 and the first center bearing bracket 236 when the vehicle (not shown) is in operation. This aids in improving the overall life and durability of the center bearing assembly 234 of the driveline 202 of the vehicle (not shown). It is within the scope of this disclosure and as a non-limiting example that when the center bearing cushion 238 is installed within the first center bearing bracket 236, at least a portion of the one or second aperture retention portions 292 may be disposed outward from at least a portion of the first side 262 and/or the second side 264 of the body portion 261 of the center bearing cushion 238.

In accordance with the embodiment illustrated in FIG. 5 and as a non-limiting example, the one or more third apertures 260 in the body portion 240 of the first center bearing bracket 236 may include one or more third aperture retention portions 294. As best seen in FIG. 5 and as a non-limiting example, the one or more third aperture retention members 294 may extend from the surface 286 defining the one or more third apertures 260 in the first center bearing bracket 236. The one or more third aperture retention members 294 may provide a positive stop for, and may be selectively engagable with, the center bearing cushion 238 when installed within the first center bearing bracket 236. As a result, it is therefore to be understood that the one or more third aperture retention portions 294 may aid in reducing the overall amount of movement and therefore frictional interaction between the center bearing cushion 238 and the first center bearing bracket 236 when the vehicle (not shown) is in operation. This aids in improving the overall life and durability of the center bearing assembly 234 of the driveline 202 of the vehicle (not shown). It is within the scope of this disclosure and as a non-limiting example that when the center bearing cushion 238 is installed within the first center bearing bracket 236, at least a portion of the one or third aperture retention portions 294 may be disposed outward from at least a portion of the first side 262 and/or the second side 264 of the body portion 261 of the center bearing cushion 238.

The first center bearing bracket 236 may include one or more first extending portions 296 and/or one or more second extending portions 298. As best seen in FIG. 5 of the disclosure and as a non-limiting example, the one or more first extending portions 296 of the first center bearing bracket 236 may extend outward from and away from the first side 242 of the body portion 240 of the first center bearing bracket 236. Additionally, as best seen in FIG. 5 and as a non-limiting example, the one or more second extending portions 298 of the first center bearing bracket 236 may extend outward from and away from the second side 244 of the body portion 240 of the first center bearing bracket 236. The one or more first and/or second extending portions 296 and/or 298 of the first center bearing bracket 236 aid in increasing the overall width of the first center bearing bracket 236. By increasing the overall width of the first center bearing bracket 236, the overall surface area contact between the first center bearing bracket 236 and the other components of the center bearing bracket assembly 200 and/or the body or frame 254 of the vehicle (not shown) increases. This aids in providing a more robust and secure connection between the first center bearing bracket 236 and the body or frame 254 of the vehicle (not shown), which in turn aids in reducing the NVH characteristics or properties and aids in increasing the overall life and durability of the center bearing assembly 234. Additionally, this aids in increasing the overall structural rigidity of the first center bearing bracket 236, which in turn aids in increasing the overall life and durability of the center bearing assembly 234.

According to the embodiment illustrated in FIG. 5 and as a non-limiting example, at least a portion of the one or more first extending portions 296 of the first center bearing bracket 236 may extend outward and away from at least a portion of the first side 242 of the first and/or third portions 246 and/or 250 of the first center bearing bracket 236. It is within the scope of this disclosure and as a non-limiting example that the overall width of the first center bearing bracket 236 at the one or more first extending portions 296 may have a substantially constant width. Additionally, it is within the scope of this disclosure and as a non-limiting example that the overall width of the first center bearing bracket 236 at the one or more first extending portions 296 may increase at a substantially constant or a variable rate as the one or more first extending portions 296 extend away from the first and/or third portions 246 and/or 250 of the body portion 240 of the first center bearing bracket 236.

The one or more first extending portions 296 of the body portion 240 of the first center bearing bracket 236 may include one or more apertures 300 therein. As best seen in FIG. 5 and as a non-limiting example, the one or more apertures 300 may extend from the inner surface 241 to the outer surface 243 of the one or more first extending portions 296 of the body portion 240 of the first center bearing bracket 236. The one or more apertures 300 in the body portion 240 of the first center bearing bracket 236 may be used in order reduce the overall weight and costs associated with the first center bearing bracket 236. Additionally, the one or more apertures 300 in the body portion 240 of the first center bearing bracket 236 may provide the access or space needed to install and secure the center bearing assembly 234 relative to the body or frame 254 of the vehicle (not shown). It is within the scope of this disclosure and as a non-limiting example that the one or more apertures 300 in the body portion 240 of the first center bearing bracket 236 may be substantially triangular in shape.

As best seen in FIG. 5 of the disclosure and as a non-limiting example, at least a portion of the one or more second extending portions 298 of the first center bearing bracket 236 may extend outward and away from at least a portion of the second side 244 of the first and/or third portions 246 and/or 250 of the first center bearing bracket 236. It is within the scope of this disclosure and as a non-limiting example that the overall width of the first center bearing bracket 236 at the one or more second extending portions 298 may have a substantially constant width. Additionally, it is within the scope of this disclosure and as a non-limiting example that the overall width of the first center bearing bracket 236 at the one or more second extending portions 298 may increase at a substantially constant or a variable rate as the one or more second extending portions 298 extend away from the first and/or third portions 246 and/or 250 of the body portion 240 of the first center bearing bracket 236. As a non-limiting example, the one or more second extending portions 298 of the body portion 240 of the first center bearing bracket 236 may be a mirror image of the one or more first extending portions 296 of the body portion 240 of the first center bearing bracket 236.

The one or more second extending portions 298 of the body portion 240 of the first center bearing bracket 236 may include one or more apertures 302 therein. As best seen in FIG. 5 and as a non-limiting example, the one or more apertures 302 may extend from the inner surface 241 to the outer surface 243 of the one or more second extending portions 298 of the body portion 240 of the first center bearing bracket 236. The one or more apertures 302 in the body portion 240 of the first center bearing bracket 236 may be used in order reduce the overall weight and costs associated with the first center bearing bracket 236. Additionally, the one or more apertures 302 in the body portion 240 of the first center bearing bracket 236 may provide the access or space needed to install and secure the center bearing assembly 234 relative to the body or frame 254 of the vehicle (not shown). It is within the scope of this disclosure and as a non-limiting example that the one or more apertures 302 in the body portion 240 of the first center bearing bracket 236 may be substantially triangular in shape. As a non-limiting example, the one or more apertures 302 in the one or more second extending portions 298 of the first center bearing bracket 236 may be a mirror image of the one or more apertures 300 in the one or more first extending portions 296 of the first center bearing bracket 236.

In accordance with the embodiment illustrated in FIG. 5 and as a non-limiting example, the first center bearing bracket 236 may include one or more first mounting portions 304 and/or one or more second mounting portions 306. The one or more first and/or second mounting portions 304 and/or 306 of the body portion 240 of the first center bearing bracket 236 may provide a mounting surface for connecting at least a portion of the first center bearing bracket 236 to at least a portion of the center bearing bracket assembly 200 or to at least a portion of the body or frame 254 of the vehicle (not shown). It is within the scope of this disclosure and as a non-limiting example that at least a portion of the one or more first mounting portions 304 of the first center bearing bracket 236 may extend substantially perpendicular to the first portion 246 of the body portion 240 of the first center bearing bracket 236. Additionally, it is within the scope of this disclosure and as a non-limiting example that at least a portion of the one or more second mounting portions 306 of the first center bearing bracket 236 may extend substantially perpendicular to the third portion 250 of the body portion 240 of the first center bearing bracket 236.

The one or more first mounting portions 304 may be disposed proximate or adjacent to an end of the first portion 246 of the body portion 240 of the first center bearing bracket 236 opposite the second portion 248 of the body portion 240 of the first center bearing bracket 236. As best seen in FIG. 5 and as a non-limiting example, the one or more first mounting portions 304 of the first center bearing bracket 236 may extend outward from and away from an end of the first portion 246, the one or more first extending portions 296, and/or the one or more second extending portions 298 of the body portion 240 of the first center bearing bracket 236 opposite the second portion 248 of the body portion 240 of the first center bearing bracket 236.

One or more first apertures 308 may be disposed within the one or more first mounting portions 304 of the body portion 240 of the first center bearing bracket 236. As best seen in FIG. 5 and as a non-limiting example, the one or more first apertures 308 may extend from the inner surface 241 to the outer surface 243 of the one or more first mounting portions 304 of the body portion 240 of the first center bearing bracket 236. The one or more first apertures 308 may be of a size and shape to receive and/or retain at least a portion of one or more first mechanical fasteners (not shown) therein. The one or more first mechanical fasteners (not shown) may be used in order to secure at least a portion of the first center bearing bracket 236 to at least a portion of the center bearing bracket assembly 200 or to the body or frame 254 of the vehicle (not shown). It is within the scope of this disclosure and as a non-limiting example that the one or more first apertures 308 may be disposed proximate to the one or more apertures 300 in the one or more first and/or second extending portions 296 and/or 298 of the first center bearing bracket 236.

According to the embodiment illustrated in FIG. 5 and as a non-limiting example, the one or more first mounting portions 304 of the body portion 240 of the first center bearing bracket 236 may include one or more receiving portions 310. The one or more receiving portions 310 in the one or more first mounting portions 304 of the body portion 240 of the first center bearing bracket 236 may be of a size and shape to receive and/or retain at least a portion of a second center bearing bracket 312 therein. It is within the scope of this disclosure and as a non-limiting example that the one or more receiving portions 310 in the one or more first mounting portions 304 of the body portion 240 of the first center bearing bracket 236 may be a recessed portion in the one or more first mounting portions 304.

The one or more second mounting portions 306 may be disposed proximate or adjacent to an end of the third portion 250 of the body portion 240 of the first center bearing bracket 236 opposite the second portion 248 of the body portion 240 of the first center bearing bracket 236. As best seen in FIG. 5 and as a non-limiting example, the one or more second mounting portions 306 of the first center bearing bracket 236 may extend outward from and away from an end of the third portion 250, the one or more first extending portions 296, and/or the one or more second extending portions 298 of the body portion 240 of the first center bearing bracket 236 opposite the second portion 248 of the body portion 240 of the first center bearing bracket 236. It is within the scope of this disclosure and as a non-limiting example that the one or more second mounting portions 306 may be co-planar with the one or more first mounting portions 304 of the body portion 240 of the first center bearing bracket 236.

One or more second apertures 309 may be disposed within the one or more second mounting portions 306 of the body portion 240 of the first center bearing bracket 236. As best seen in FIG. 5 and as a non-limiting example, the one or more second apertures 309 may extend from the inner surface 241 to the outer surface 243 of the one or more second mounting portions 306 of the body portion 240 of the first center bearing bracket 236. The one or more second apertures 309 may be of a size and shape to receive and/or retain at least a portion of one or more second mechanical fasteners (not shown) therein. The one or more second mechanical fasteners (not shown) may be used in order to secure at least a portion of the first center bearing bracket 236 to at least a portion of the center bearing bracket assembly 200 or to the body or frame 254 of the vehicle (not shown). It is within the scope of this disclosure and as a non-limiting example that the one or more second apertures 309 may be disposed proximate to the one or more apertures 302 in the one or more first and/or second extending portions 296 and/or 298 of the first center bearing bracket 236.

According to the embodiment illustrated in FIG. 5 and as a non-limiting example, the one or more second mounting portions 306 of the body portion 240 of the first center bearing bracket 236 may include one or more receiving portions 311. The one or more receiving portions 311 in the one or more second mounting portions 306 of the body portion 240 of the first center bearing bracket 236 may be of a size and shape to receive and/or retain at least a portion of the second center bearing bracket 312 therein. It is within the scope of this disclosure and as a non-limiting example that the one or more receiving portions 311 in the one or more second mounting portions 306 of the body portion 240 of the first center bearing bracket 236 may be a recessed portion in the one or more second mounting portions 306.

Figure 11:
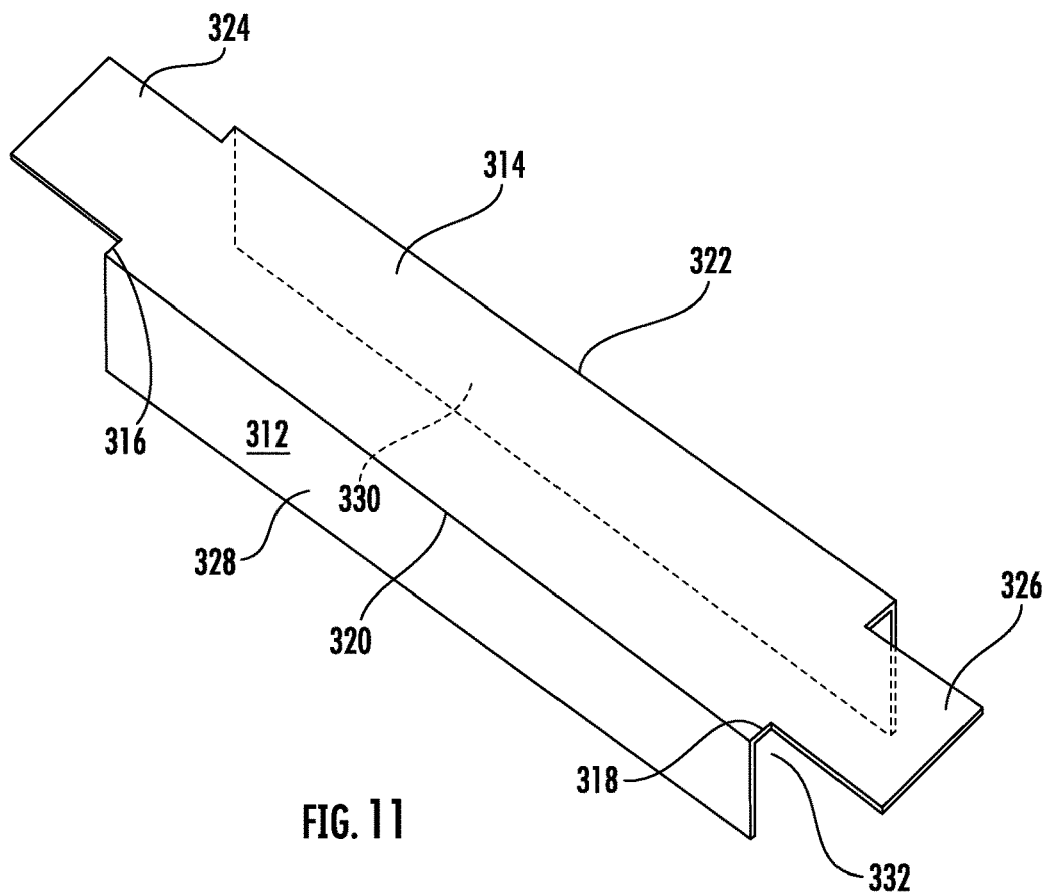
FIG. 11 is a schematic perspective view of a portion of the center bearing bracket assembly according to the embodiment of the disclosure illustrated in FIGS. 3-10 of the disclosure.

As best seen in FIG. 11 of the disclosure and as a non-limiting example, the second center bearing bracket 312 may have a body portion 314 having a first end 316, a second end 318, a first side 320, and a second side 322. At least a portion of the second center bearing bracket 312 may be used in order to aid in securing the center bearing cushion 238 relative to the first center bearing bracket 236 when installed within the driveline 202 of the vehicle (not shown). This aids in reducing the overall amount of movement and therefore frictional interaction between the center bearing cushion 238 and the first center bearing bracket 236 when the vehicle (not shown) is in operation. As a result, this aids in improving the overall life and durability of the center bearing assembly 234 of the driveline 202 of the vehicle (not shown).

The second center bearing bracket 312 may include one or more first extending portions 324 and/or one or more second extending portions 326. As illustrated in FIG. 11 and as a non-limiting example, the one or more first and/or second extending portions of the second center bearing bracket 312 may extend outward from at least a portion of the first and/or second ends 316 and/or 318 of the body portion 314 of the second center bearing bracket 312 respectively. The one or more first extending portions 324 and/or one or more second extending portions 326 of the second center bearing bracket 312 may aid in securing the second center bearing bracket 312 relative to the first center bearing bracket 236 when assembled. As a result, it is within the scope of this disclosure and as a non-limiting example that the one or more first and/or second extending portions 324 and/or 326 of the second center bearing bracket 312 may be of a size and shape to be received and/or retained within at least a portion of the one or more receiving portions 310 and/or 311 in one or more first and/or second mounting portions 304 and/or 306 of the first center bearing bracket 236.

In accordance with the embodiment where the one or more receiving portions 310 and/or 311 in one or more first and/or second mounting portions 304 and/or 306 of the first center bearing bracket 236 are a recessed portion, it is within the scope of this disclosure and as a non-limiting example that the depth of the one or more receiving portions 310 and/or 311 may be substantially equal to the thickness of the one or more first and/or second extending portions 324 and/or 326 of the second center bearing bracket 312.

The second center bearing bracket 312 may include one or more first wall portions 328 and/or one or more first wall portions 330. As best seen in FIG. 11 of the disclosure and as a non-limiting example, the one or more first wall portions 328 may extend outward and away from at least a portion of the first side 320 of the body portion 314 of the second center bearing bracket 312. Additionally, as best seen in FIG. 11 and as a non-limiting example, the one or more second wall portions 330 may extend outward and away from at least a portion of the second side 322 of the body portion 314 of the second center bearing bracket 312. The one or more first and/or second wall portions 328 and/or 330 may aid in preventing the center bearing cushion 238 from rotating when installed by providing a positive stop for the center bearing cushion 238. It is within the scope of this disclosure and as a non-limiting example that the one or more first and/or second wall portions 328 and/or 330 may extend substantially parallel to each other. Additionally, it is within the scope of this disclosure and as a n on-limiting example that the one or more first and/or second wall portions 328 and/or 330 may extend substantially perpendicular to the body portion 314 of the second center bearing bracket 312 of the center bearing bracket assembly 200.

The body portion 314, the one or more first wall portions 328, and/or the one or more second wall portions 330 may define a receiving portion 332 therein. The receiving portion 332 of the second center bearing bracket 312 may be of a size and shape to receive and/or retain at least a portion of the center bearing cushion 238 therein. As a result, when the second center bearing bracket 312 is assembled relative to the center bearing cushion 238 and the first center bearing bracket 238, at least a portion of the one or more first wall portions 328 may be disposed proximate to the first side 262 of the center bearing cushion 238 and the one or more second wall portions 330 may be disposed proximate to the second side 264 of the center bearing cushion 238.

In accordance with the embodiment illustrated in FIGS. 8 and 10 of the disclosure and as a non-limiting example, the center bearing bracket assembly 200 may include one or more plates 334 and/or one or more attachment members 336. The one or more plates 334 may have a body portion 338 having an inner surface 340, an outer surface 342, a first end 344, a second end 346, a first end portion 348, a second end portion 350, a first side 352, a second side 354, a first side portion 356, and a second side portion 358. The one or more plates 334 may be used to connect at least a portion of the one or more first center bearing brackets 236 to at least a portion of the body or frame 254 of the vehicle (not shown). It is within the scope of this disclosure and as a non-limiting example that the one or more plates 334 may be integrally formed as part of the body or frame 254 or the one or more plates 334 may be a separate component that is connectable to at least a portion of the body or frame 245 of the vehicle (not shown). Additionally, it is within the scope of this disclosure and as a non-limiting example that the one or more plates may be integrally formed as part of the first center bearing bracket 236 and/or the second center bearing bracket 312 or the one or more plates 334 may be a separate component from and may be connectable to at least a portion of the first center bearing bracket 236 and/or the second center bearing bracket 312 of the center bearing bracket assembly 200.

According to the embodiment illustrated in FIG. 8 and as a non-limiting example, the one or more plates 334 may include one or more first plate attachment apertures 370 and/or one or more second plate attachment apertures 372 having a size and shape to receive and/or retain at least a portion of one or more mechanical fasteners (not shown) therein. The one or more first and/or second plate attachment apertures 370 and/or 372 may be used in order to secure at least a portion of the one or more plates 334 to at least a portion of the first center bearing bracket 236 of the center bearing bracket assembly 200. It is therefore within the scope of this disclosure and as a non-limiting example that at least a portion of the one or more first plate attachment apertures 370 in the one or more plates 334 may be aligned with at least a portion of the one or more first apertures 308 in the one or more first mounting portions 304 of the first center bearing bracket 236. Additionally, it is within the scope of this disclosure and as a non-limiting example that at least a portion of the one or more second plate attachment apertures 372 may be aligned with at least a portion of the one or more second apertures 309 in the one or more second mounting portions 306 of the first center bearing bracket 236.

As best seen in FIG. 8 and as a non-limiting example, the one or more first plate attachment apertures 370 may be disposed within at least a portion of the first end portion 348 of the one or more first plates 334 of the center bearing bracket assembly 200. Additionally, as best seen in FIG. 8 of the disclosure and as a non-limiting example, the one or more second plate attachment apertures 372 may be disposed within at least a portion of the second end portion 350 of the one or more first plates 334 of the center bearing bracket assembly 200. Furthermore, as best seen in FIG. 8 and as a non-limiting example, the one or more first and/or second attachment apertures 370 and/or 372 may be disposed within at least a portion of the first and/or second side portion 356 and/or 358 of the one or more plates 334. It is within the scope of this disclosure and as a non-limiting example that the one or more first and/or second plate attachment apertures 370 and/or 372 may be disposed outward from a first side portion 374 and/or a second side portion 376 of the body or frame 254 of the vehicle (not shown). This aids in providing the space needed to secure at least a portion of the first center bearing bracket 236 to at least a portion of the one or more plates 334.

In order to secure at least a portion of the one or more plates 334 to at least a portion of the body or frame 254 of the vehicle (not shown), the one or more plates 334 may include one or more third plate attachment apertures 360 and/or one or more fourth plate attachment apertures 362 therein. The one or more third and/or fourth plate attachment apertures 360 and/or 362 may extend from the inner surface 340 to the outer surface 342 of the one or more plates 334. As best seen in FIG. 8 and as a non-limiting example, the one or more third plate attachment apertures 360 may be disposed within the first end portion 348 of the one or more plates 334 and the one or more fourth plate attachment apertures 362 may be disposed within the second end portion 350 of the one or more plates 334 of the center bearing bracket assembly 200. At least a portion of the one or more third and/or fourth plate attachment apertures 360 and/or 362 may be aligned with at least a portion of one or more first attachment apertures 365 extending from an inner surface 366 to an outer surface 368 of a bottom portion 364 of the body or frame 254 of the vehicle (not shown). The one or more third attachment apertures 360 in the one or more first plates 334, the one or more fourth attachment apertures 362 in the one or more first plates 334, and/or the one or more one or more first attachment apertures 365 in the body or frame 254 of the vehicle (not shown) may be of a size and shape to receive and/or retain at least a portion of one or more mechanical fasteners therein. It is within the scope of this disclosure and as a non-limiting example that the one or more first and/or second plate attachment apertures 370 and/or 372 in the one or more plates 334 may be disposed inward from and adjacent to the one or more third and/or fourth plate attachment apertures 360 and/or 362 in the body or frame 254 respectively.

The one or more plates 334 may have one or more receiving portions 378 therein. As best seen in FIGS. 8 and 10 and as a non-limiting example, the one or more receiving portions 378 may extend inward into the body portion 338 of the one or more plates 334 from at least a portion of the second side 354 of the body portion 338 of the one or more plates 334. The one or more receiving portions 378 may be of a size and shape to receive at least a portion of the first joint assembly 210 therein when in operation. The one or more receiving portions 378 in the one or more plates 334 may aid in increasing the overall maximum articulation angle for the first joint assembly 210 of the driveline 202 of the vehicle (not shown).

In accordance with the embodiment illustrated in FIG. 10 and as a non-limiting example, the one or more attachment members 336 may have an inner surface 380, an outer surface 382, a first end portion 384, a second end portion 386, a first end 388, and a second end 390. The one or more attachment members 336 may be used in order to connect at least a portion of the first center bearing bracket 236 and/or the one or more plates 334 to at least a portion of the body or frame 254 of the vehicle (not shown). As best seen in FIG. 10 of the disclosure and as a non-limiting example, at least a portion of the one or more attachment members 336 may be disposed radially outward from and at least a portion of the one or more plates 334 and/or the first center bearing bracket 236 of the center bearing bracket assembly 200. Additionally as best seen in FIG. 10 and as a non-limiting example, at least a portion of the one or more attachment members 336 may be disposed outward from and adjacent to at least a portion of the first side portion 374 and/or the second side portion 376 of the body or frame 254 of the vehicle (not shown).

The one or more attachment members 336 may include one or more first attachment apertures 392 and/or one or more second attachment apertures 394. As best seen in FIG. 10 and as a non-limiting example, the one or more first attachment apertures 392 in the one or more attachment members 336 may extend from the inner surface 380 to the outer surface 382 of the first end portion 384 of the one or more attachment members 336. At least a portion of the one or more first attachment apertures 392 may be aligned with at least a portion of one or more second attachment apertures 396 extending from the inner surface 366 to the outer surface 368 of the first and/or second side portion 374 and/or 376 of the body or frame 254 of the vehicle (not shown). The one or more first attachment apertures 392 in the one or more attachment members 336 and the one or more second attachment apertures 396 in the body or frame 254 of the vehicle (not shown) may be of a size and shape to receive and/or retain at least a portion of one or more mechanical fasteners (not shown) therein. As a result, it is therefore to be understood that the one or more attachment members 336 may connect at least a portion of the one or more attachment members 336, the one or more plates 336, and/or the first center bearing bracket 236 to at least a portion of the body or frame 254 of the vehicle (not shown).

Extending outward from at least a portion of the second end 390 of the one or more attachment members 336, and away from the body or frame 254 of the vehicle (not shown), is one or more first extending portions 398. At least a portion of the one or more first extending portions 398 of the one or more attachment members 336 may be disposed radially outboard from and adjacent to at least a portion of the one or more plates 334 and/or the first center bearing bracket 236 of the center bearing bracket assembly 200. Additionally, at least a portion of the one or more second attachment apertures 394 of the one or more attachment members 336 may be disposed within at least a portion of the one or more first extending portions 398 of the one or more attachment members 336. The one or more second attachment apertures 394 of the one or more attachment members 336 may be of a size and shape to receive and/or retain at least a portion of one or more mechanical fasteners (not shown) therein. In accordance with the embodiment illustrated in FIG. 10 and as a non-limiting example, at least a portion of the one or more second attachment apertures 394 of the one or more attachment members 336 may be aligned with at least a portion of the one or more first plate attachment apertures 370 in the one or more plates 334, one or more second plate attachment apertures 372 in the one or more plates 334, the one or more first apertures 308 in the one or more first mounting portions 304 of the first center bearing bracket 236, and/or the one or more second apertures 309 in the one or more second mounting portions 306 of the first center bearing bracket 236. It is within the scope of this disclosure and as a non-limiting example that the one or more attachment members 336 may have a substantially L-shaped cross-sectional shape.

The one or more attachment members 336 may have one or more receiving portions 400 therein. As best seen in FIG. 10 and as a non-limiting example, the one or more receiving portions 400 may extend inward into the one or more first extending portions 398 of the one or more attachment members 336 from at least a portion of an end of the one or more first extending portions 398 opposite the body or frame 254 of the vehicle (not shown). The one or more receiving portions 400 of the one or more attachment members 336 may be of a size and shape to receive at least a portion of the first joint assembly 210 therein when in operation. The one or more receiving portions 400 in the one or more attachment members 336 may aid in increasing the overall maximum articulation angle for the first joint assembly 210 of the driveline 202 of the vehicle (not shown).

It is within the scope of this disclosure and as a non-limiting example that the one or more plates 334 and the one or more attachment members 336 may be separate components or may be a single integrally formed component.

Figure 12:
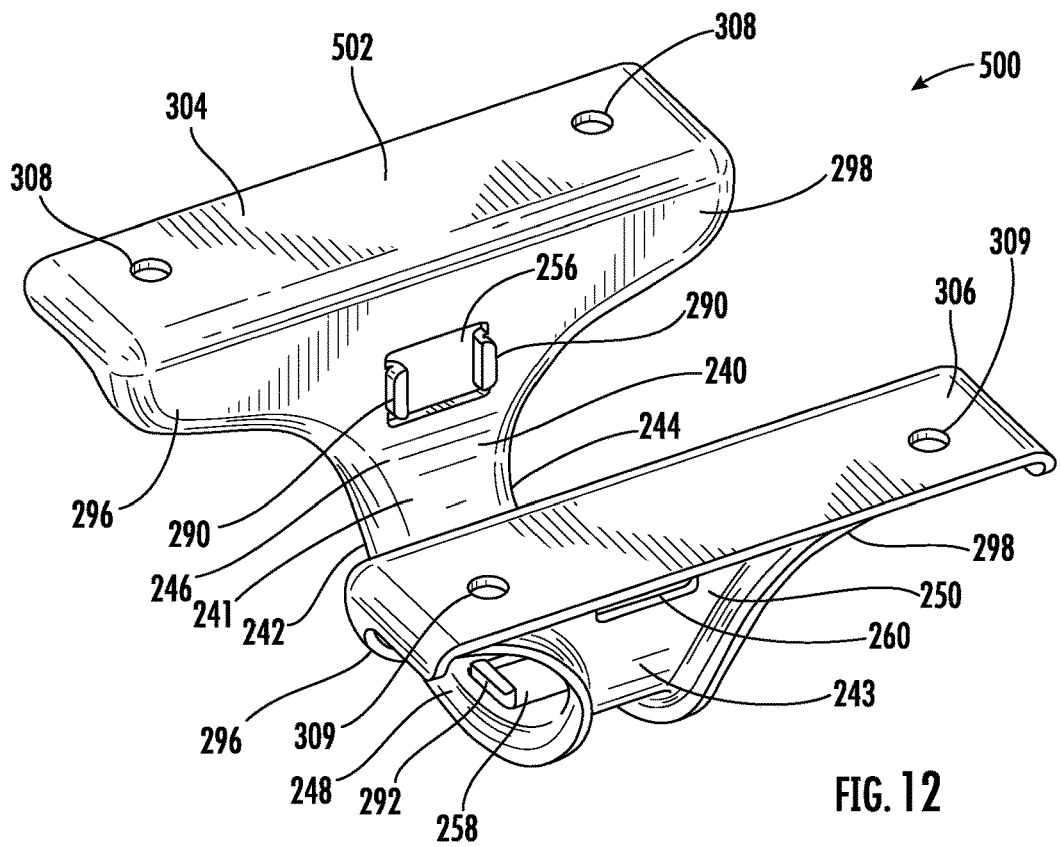
FIG. 12 is a schematic perspective view of a first center bearing bracket according to an alternative embodiment of the disclosure for use in a center bearing bracket assembly.

FIG. 12 is a schematic perspective view of a first center bearing bracket 502 of a center bearing bracket assembly 500 according to another embodiment of the disclosure. The first center bearing bracket 502 and the center bearing bracket assembly 500 illustrated in FIG. 12 is the same as the first center bearing bracket 236 and the center bearing bracket assembly 200 illustrated in FIGS. 3-11, except where specifically noted below. In accordance with the embodiment illustrated in FIG. 12 of the disclosure and as a non-limiting example, the one or more first extending portions 296 of the body portion 240 of the first center bearing bracket 502 may not include the one or more apertures 300 described and illustrated in relation to FIGS. 3-11. Additionally, in accordance with the embodiment illustrated in FIG. 12 and as a non-limiting example, the one or more second extending portions 298 of the body portion 240 of the first center bearing bracket 502 may not include the one or more apertures 302 described and illustrated in relation to FIGS. 3-11 of the disclosure. As a result, it is therefore within the scope of this disclosure and as a non-limiting example that the one or more first and/or second extending portions 296 and/or 298 of the body portion 240 of the first center bearing bracket 502 may be substantially solid without any apertures therein.

Figure 13:
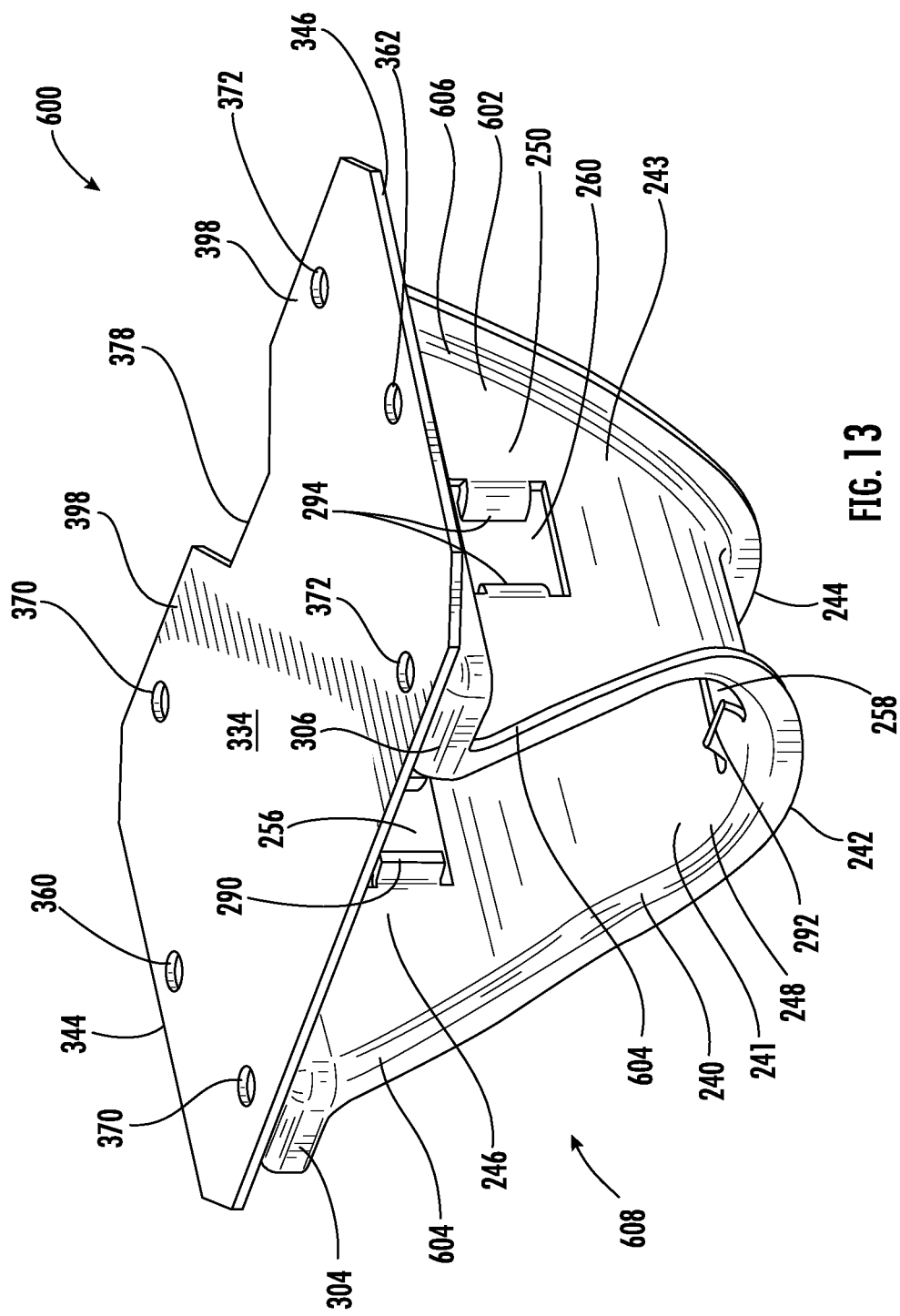
FIG. 13 is a schematic perspective view of a first center bearing bracket according to another embodiment of the disclosure for a center bearing bracket assembly.

According to the embodiment illustrated in FIG. 12 of the disclosure and as a non-limiting example, the one or more first mounting portions 304 of the body portion 240 of the first center bearing bracket 502 may not include the one or more receiving portions 310 as described and illustrated in relation to FIGS. 3-11. Additionally, according to the embodiment illustrated in FIG. 12 and as a non-limiting example, the one or more second mounting portions 306 of the body portion 240 of the first center bearing bracket 502 may not include the one or more receiving portions 311 as described and illustrated in relation to FIGS. 3-11 of the disclosure. As a result, it is therefore within the scope of this disclosure and as a non-limiting example that the one or more first and/or second mounting portions 304 and/or 306 of the body portion 240 of the first center bearing bracket 502 may be a substantially flat FIG. 13 is a schematic perspective view of a first center bearing bracket 602 of a center bearing bracket assembly 600 according to an alternative embodiment of the disclosure. The first center bearing bracket 602 and the center bearing bracket assembly 600 illustrated in FIG. 13 is the same as the first center bearing bracket 236 and 502 and the center bearing bracket assembly 200 and 500 illustrated in FIGS. 3-12, except where specifically noted below. As illustrated in FIG. 13 of the disclosure and as a non-limiting example, the first center bearing bracket 602 of the center bearing bracket assembly 600 may include one or more first extending portions 604 and/or one or more second extending portions 606.

The one or more first extending portions 604 of the first center bearing bracket 602 may extend may extend outward and away from at least a portion of the first side 242 of the first, second, and/or third portions 246, 248, and/or 250 of the first center bearing bracket 602 of the center bearing bracket assembly 600. According to the embodiment illustrated in FIG. 13 of the disclosure and as a non-limiting example, the one or more first extending portions 604 may extend outward from and away from the first side 242 of the body portion 240 of the first center bearing bracket 602. Additionally, according to the embodiment illustrated in FIG. 13 and as a non-limiting example, the one or more second extending portions 606 may extend outward from and away from the second side 244 of the body portion 240 of the first center bearing bracket 606. The one or more first and/or second extending portions 604 and/or 606 of the first center bearing bracket 602 aid in increasing the overall width of the first center bearing bracket 602. By increasing the overall width of the first center bearing bracket 602, the overall surface area contact between the first center bearing bracket 602 and the other components of the center bearing bracket assembly 600 and/or the body or frame 254 of the vehicle (not shown). This aids in providing a more robust and secure connection between the first center bearing bracket 602 and the body or frame 254 of the vehicle (not shown), which in turn aids in reducing the NVH characteristics or properties and aids in increasing the overall life and durability of the center bearing assembly 608. Additionally, this aids in increasing the overall structural rigidity of the first center bearing bracket 602, which in turn aids in increasing the overall life and durability of the center bearing assembly 608.

In accordance with the embodiment illustrated in FIG. 13 of the disclosure and as a non-limiting example, the one or more first extending portions 604 may extend outward and away from at least a portion of the first side 242 of the first, second, and/or third portions 246, 248, and/or 250 of the first center bearing bracket 602 of the center bearing bracket assembly 600. It is within the scope of this disclosure and as a non-limiting example that the overall width of the first center bearing bracket 602 at the one or more first extending portions 604 may increase at a substantially constant or a variable rate as the one or more first extending portions 604 extend away from the first, second, and/or third portions 246, 248, and/or 250 of the body portion 240 of the first center bearing bracket 602.

The one or more first extending portions 604 of the first center bearing bracket 602 may extend may extend outward and away from at least a portion of the first side 242 of the first, second, and/or third portions 246, 248, and/or 250 of the first center bearing bracket 602 of the center bearing bracket assembly 600. Additionally, the one or more second extending portions 606 of the first center bearing bracket 602 may extend may extend outward and away from at least a portion of the second side 244 of the first, second, and/or third portions 246, 248, and/or 250 of the first center bearing bracket 602 of the center bearing bracket assembly 600. The one or more first and/or second extending portions 604 and/or 606 of the first center bearing bracket 602 aid in increasing the overall width of the first center bearing bracket 602. By increasing the overall width of the first center bearing bracket 602, the overall surface area contact between the first center bearing bracket 602 and the other components of the center bearing bracket assembly 600 and/or the body or frame 254 of the vehicle (not shown) is increased. This aids in providing a more robust and secure connection between the first center bearing bracket 602 and the body or frame 254 of the vehicle (not shown), which in turn aids in reducing the NVH characteristics or properties and aids in increasing the overall life and durability of the center bearing assembly 608. Additionally, this aids in increasing the overall structural rigidity of the first center bearing bracket 602, which in turn aids in increasing the overall life and durability of the center bearing assembly 608.

According to the embodiment illustrated in FIG. 13 of the disclosure and as a non-limiting example, the one or more first extending portions 604 of the body portion 240 of the first center bearing bracket 602 may not include the one or more apertures 300 described and illustrated in relation to FIGS. 3-11. Additionally, in accordance with the embodiment illustrated in FIG. 13 and as a non-limiting example, the one or more second extending portions 606 of the body portion 240 of the first center bearing bracket 602 may not include the one or more apertures 302 described and illustrated in relation to FIGS. 3-11 of the disclosure. As a result, it is therefore within the scope of this disclosure and as a non-limiting example that the one or more first and/or second extending portions 604 and/or 606 of the body portion 240 of the first center bearing bracket 602 may be substantially solid without any apertures therein.

Figure 14:
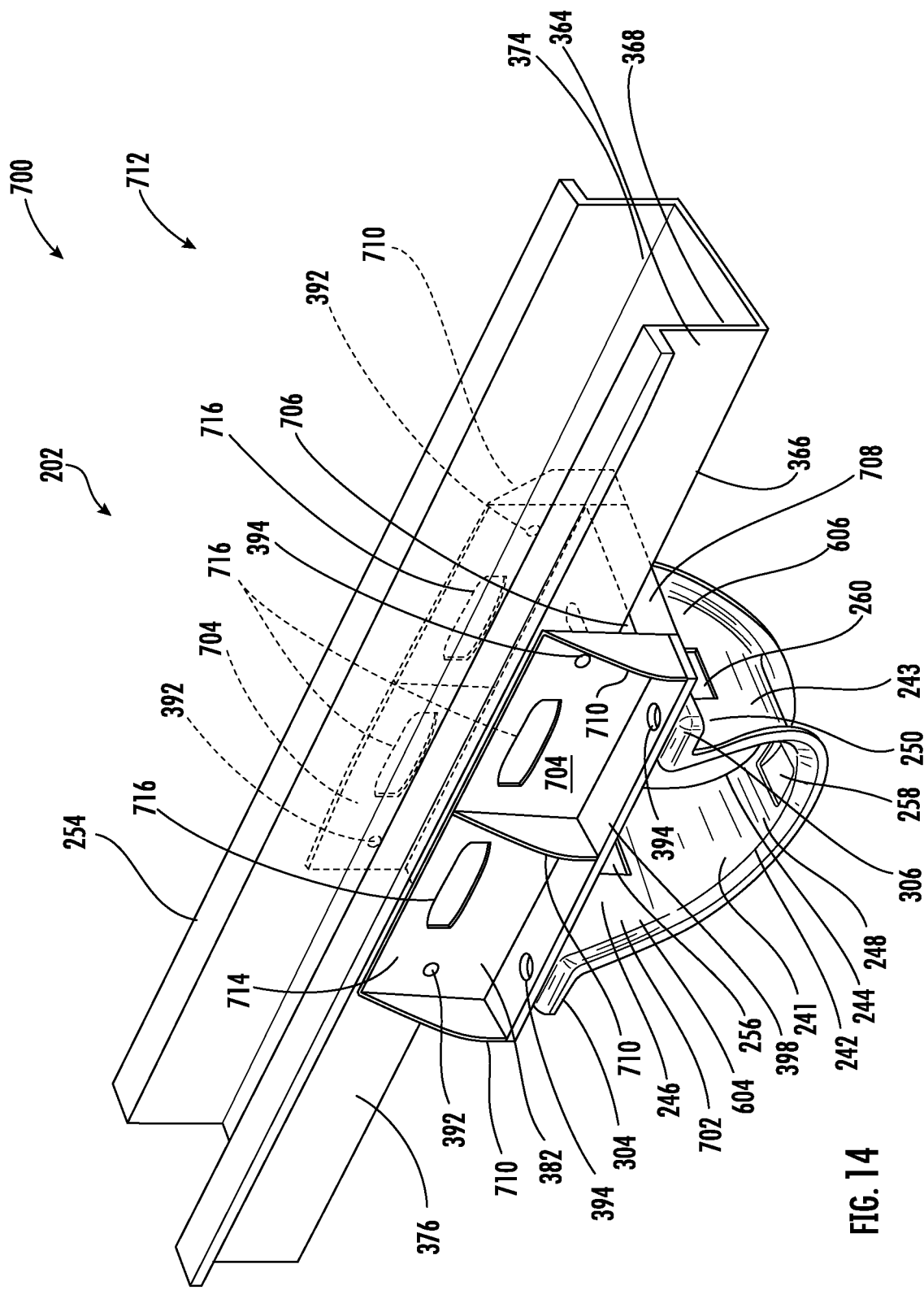
FIG. 14 is a schematic perspective view of a center bearing bracket assembly according to yet another embodiment of the disclosure.

FIG. 14 provides a schematic perspective view of a portion of the center bearing bracket assembly 700 according to yet another embodiment of the disclosure. The center bearing bracket assembly 700 illustrated in FIG. 14 is the same as the center bearing bracket assemblies 200, 500, and/or 600 illustrated in FIGS. 3-13, except where specifically noted below. As illustrated in FIG. 14 and as a non-limiting example, the center bearing bracket assembly 700 may include a first center bearing bracket 702, one or more attachment members 704, and/or one or more plates 706. The first center bearing bracket 702, the one or more attachment members 704, and the one or more plates 706 illustrated in FIG. 14 are the same as the first center bearing bracket 236, 502, and/or 602, the one or more plates 334, and the one or more attachment members 336 described and illustrated in relation to FIGS. 3-13, except where specifically noted below.

In accordance with the embodiment illustrated in FIG. 14 and as a non-limiting example, the first center bearing bracket 702 may not include the one or more first aperture retention portions 290, the one or more second aperture retention portions 292, and/or the one or more third aperture retention portions 294. As a result, it is within the scope of this disclosure and as a non-limiting example that the first center bearing bracket 702 illustrated in FIG. 14 may be the same as the first center bearing bracket 602 illustrated in FIG. 13 without the one or more first, second, and/or third aperture retention portions 290, 292, and/or 294 described and illustrated previously herein.

As illustrated in FIG. 14 of the disclosure and as a non-limiting example, the one or more attachment members 704 may include one or more ribs 710. The one or more ribs 710 may extend outward from at least a portion of the outer surface 382 of the one or more attachment members 704 of the center bearing bracket assembly 700. The one or more ribs 710 aid in increasing the overall structural rigidity of the one or more attachment members 704, while reducing the overall NVH characteristics and increasing the overall life and durability of the center bearing assembly 712 of the vehicle (not shown). It is within the scope of this disclosure and as a non-limiting example that the one or more ribs 710 of the one or more attachment members 704 may extend substantially perpendicular relative to a body portion 714 of the one or more attachment members 704 and/or substantially perpendicular relative to the one or more first extending portions 398 of the one or more attachment members 704.

The one or more attachment members 704 may include one or more apertures 716 therein. As illustrated in FIG. 14 of the disclosure and as a non-limiting example, the one or more apertures 716 in the one or more attachment members 704 may extend from the inner surface 380 to the outer surface 382 of the body portion 714 of the one or more attachment members 704 of the center bearing bracket assembly 700. The one or more apertures 716 in the one or more attachment members 704 may be used in order to reduce the overall weight and costs associated with the one or more attachment members 704. This aids in reducing the overall weight of the vehicle (not shown), which in turn aids in increasing the overall fuel efficiency of the vehicle (not shown). It is within the scope of this disclosure and as a non-limiting example that the one or more apertures 716 in the one or more attachment members 704 may be interposed between the one or more ribs 710 of the one or more attachment members 704.

According to the embodiment illustrated in FIG. 14 of the disclosure and as a non-limiting example, the one or more plates 706 may include one or more second extending portions 708. The one or more second extending portions 708 may extend radially outward and away from the body portion 338 of the one or more plates 706 from at least a portion of the first end 344 and/or the second end 346 of the one or more plates 706 of the center bearing bracket assembly 700. The one or more second extending portions 708 may provide an extension needed to ensure that a center bearing assembly 712 is installed at a pre-determined location within the driveline 202 of the vehicle (not shown) relative to the body or frame 254 of the vehicle (not shown). When installed within the vehicle (not shown), at least a portion of the one or more second extending portions 708 may be connected to at least a portion of the one or more attachment members 704, the first side portion 374 of the body or frame 254, the second side portion 376 of the body or frame 254, and/or the bottom portion 364 of the body or frame 254 of the vehicle (not shown). As a result, the one or more second extending portions 708 may aid in ensuring that the center bearing assembly 712 is installed in its ideal location in a secure manner while reducing the overall NVH characteristics and increasing the overall life and durability of the center bearing assembly 712 of the vehicle (not shown). It is within the scope of this disclosure and as a non-limiting example that the one or more second extending portions 708 of the one or more plates 706 may extend substantially perpendicular relative to the body portion 338 of the one or more plates 706. As a non-limiting example, at least a portion of the one or more second extending portions 708 may be connected to at least a portion of the one or more attachment members 704, the first side portion 374 of the body or frame 254, the second side portion 376 of the body or frame 254, and/or the bottom portion 364 of the body or frame 254 by using one or more mechanical fasteners, one or more welds, and/or one or more adhesives.

It is within the scope of this disclosure and as a non-limiting example that the one or more plates 706 and the one or more attachment members 704 may be separate components or may be a single integrally formed component.

Figure 15:
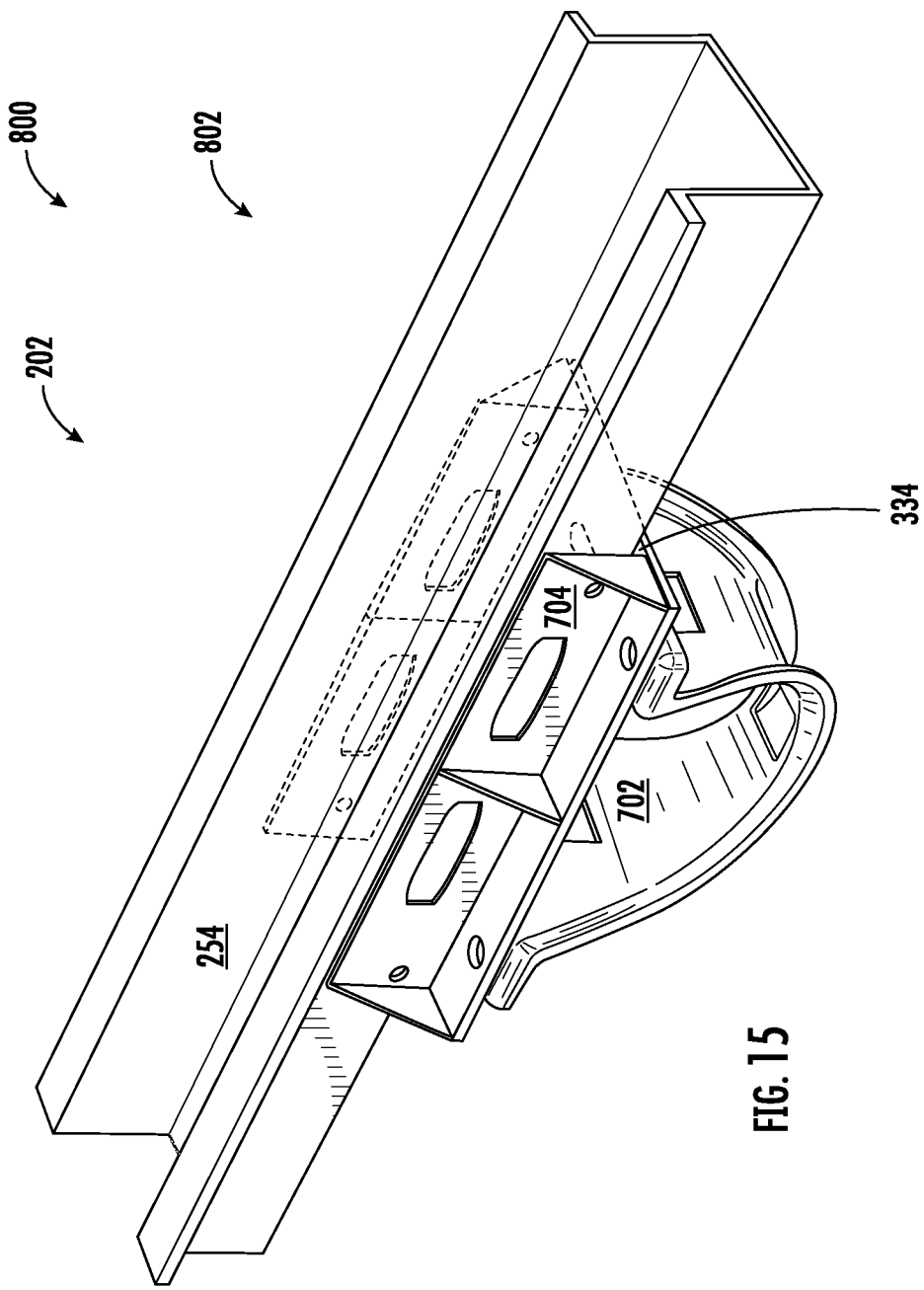
FIG. 15 is a schematic perspective view of a center bearing bracket assembly according to still yet another embodiment of the disclosure.

FIG. 15 is a schematic perspective view of a center bearing bracket assembly 800 according to still yet another embodiment of the disclosure. The center bearing bracket assembly 800 illustrated in FIG. 15 is the same as the center bearing bracket assembly 200, 500, 600, and/or 700 illustrated in FIGS. 3-14, except where specifically noted below. In accordance with the embodiment illustrated in FIG. 15 and as a non-limiting example, the center bearing bracket assembly 800 includes the first center bearing bracket 702, the one or more plates 334, and the one or more attachment members 704 as described and illustrated herein in order to secure at least a portion of the center bearing assembly 802 and the first center bearing bracket 702 to at least a portion of the body or frame 254 of the vehicle (not shown). As a result, the center bearing bracket assembly 800 illustrated in FIG. 15 provides a more robust and compact version of the center bearing bracket assembly 200, 500, 600, and/or 700 described and illustrated in relation to the embodiment illustrated in FIGS. 2-14 of the disclosure.

It is within the scope of this disclosure and as a non-limiting example that the one or more plates 334 and the one or more attachment members 704 may be separate components or may be a single integrally formed component.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

We claim:

1. A bracket assembly, comprising:
   a first center bearing bracket;
   one or more plates;
      wherein at least a portion of said one or more plates are connected to at least a portion of said first center bearing bracket and to at least a portion of a vehicle body or frame; one or more attachment members; and
      wherein at least a portion of said one or more attachment members are connected to at least a portion of said first center bearing bracket, to at least a portion of said one or more plates, and/or to at least a portion of said vehicle body or frame;
      wherein said first center bearing bracket has a body portion having an inner surface, an outer surface, a first side, a second side, a first portion, a second portion, and a third portion and said first and said third portions are disposed on opposing ends of said second portion and extend away from said second portion of said center bearing bracket;
      wherein said first center bearing bracket has one or more first extending portions extending outward and away from at least a portion of said first side of said body portion of said first center bearing bracket;
      wherein said first center bearing bracket has one or more second extending portions extending outward and away from at least a portion of said second side of said body portion of said first center bearing bracket;
      wherein said first center bearing bracket has one or more first mounting portions extending outward and away from at least a portion of said one or more first extending portions, said one or more second extending portions, and said first portion of said body portion of said first center bearing bracket;
      wherein said first center bearing bracket has one or more second mounting portions extending outward and away from at least a portion of said one or more first extending portions, said one or more second extending portions, and said third portion of said body portion of said first center bearing bracket;
      wherein said one or more first mounting portions of said first center bearing bracket have one or more receiving portions therein;
      wherein said one or more second mounting portions of said first center bearing bracket have one or more receiving portions therein;
      wherein said one or more receiving portions in said one or more first mounting portions of said first center bearing bracket and said one or more receiving portions in said one or more second mounting portions of said first center bearing bracket are of a size and shape to receive and retain at least a portion of a second center bearing bracket therein; and
      wherein said second center bearing bracket has a size and shape to receive and retain at least a portion of a center bearing cushion therein.

2. The bracket assembly of claim 1, wherein said one or more plates and said one or more attachment members are integrally formed as a single component; and wherein said one or more plates are integrally formed as part of said vehicle body or frame.

3. The bracket assembly of claim 1, further comprising:
one or more apertures extending from said inner surface to said outer surface of said one or more first extending portions of said first center bearing bracket; and
one or more apertures extending from said inner surface to said outer surface of said one or more second extending portions of said first center bearing bracket.

4. The bracket assembly of claim 1, wherein said one or more plates have one or more receiving portions therein having a size and shape to receive at least a portion of a first joint assembly therein when in operation.

5. The bracket assembly of claim 1, wherein said one or more attachment members have one or more first extending portions extending outward therefrom away from said vehicle body or frame; and
wherein at least a portion of said one or more first extending portions of said one or more attachment members are connected to at least a portion of said one or more plates and said first center bearing bracket.

6. The bracket assembly of claim 5, wherein said one or more attachment members has one or more ribs and one or more receiving portions;
wherein said one or more ribs of said one or more attachment members extend outward from a body portion of said one or more attachment members and said one or more first extending portions of said one or more attachment members; and
wherein said one or more receiving portions in said one or more extending portions of said one or more attachment members have a size and shape to receive at least a portion of a first joint assembly therein when in operation.

7. The Bracket Assembly of claim 1, wherein said one or more plates have one or more extending portions extending outward away from said one or more plates toward said vehicle body or frame; and
wherein at least a portion of said one or more extending portions of said one or more plates are connected to at least a portion of said vehicle body or frame and/or said one or more attachment members.

* * * * *